(12) United States Patent
Nakamura

(10) Patent No.: US 7,970,236 B2
(45) Date of Patent: Jun. 28, 2011

(54) IMAGE TRANSFORM APPARATUS AND IMAGE TRANSFORM PROGRAM

(75) Inventor: Yoshiki Nakamura, Tokyo (JP)

(73) Assignee: Tokyo Institute of Technology (JP)

( * ) Notice: Subject to any disclaimer, the term of this patent is extended or adjusted under 35 U.S.C. 154(b) by 822 days.

(21) Appl. No.: 11/997,076

(22) PCT Filed: Nov. 29, 2006

(86) PCT No.: PCT/JP2006/323822
§ 371 (c)(1),
(2), (4) Date: Jan. 28, 2008

(87) PCT Pub. No.: WO2007/122766
PCT Pub. Date: Nov. 1, 2007

(65) Prior Publication Data
US 2010/0215264 A1 Aug. 26, 2010

(30) Foreign Application Priority Data
Apr. 18, 2006 (JP) .................................. 2006-114119

(51) Int. Cl.
*G06K 9/36* (2006.01)
*G06K 9/00* (2006.01)
(52) U.S. Cl. ....................................... 382/276; 382/167
(58) Field of Classification Search .................. 382/167, 382/276, 284, 294, 298, 299, 254, 232, 248; 358/518–523; 345/589–605
See application file for complete search history.

(56) References Cited

U.S. PATENT DOCUMENTS

| 5,892,850 A | 4/1999 | Tsuruoka |
| 6,738,169 B1 * | 5/2004 | Nakase ........................... 358/539 |
| 6,778,608 B1 * | 8/2004 | Berthelot et al. ......... 375/240.18 |

FOREIGN PATENT DOCUMENTS

| JP | 9-284798 | 10/1997 |
| WO | WO-2006/132014 A1 | 12/2006 |

OTHER PUBLICATIONS

"Colorimetry", *Technical Report—CIE 15:2004 (3rd Edition)*, CIE—Commission Internationale de L'Eclairage International Commission on Illumination Internationale Beleuchtungskommission, (2004), 18 pgs.

(Continued)

*Primary Examiner* — Yon Couso
(74) *Attorney, Agent, or Firm* — Clise, Billion & Cyr, P.A.; Tim Clise

(57) ABSTRACT

An image transform apparatus includes: a resolution device performing wavelet resolution based on an image representing distribution of psycho-physical color to generate sub band images at one resolution level or more; a transform device transforming values of pixels of the sub band images from values of the psycho-physical color to values of perceived color based on a predetermined relation between the psycho-physical color and the perceived color; and a synthesis device performing wavelet synthesis based on the sub band images at one resolution level or more resulting from the transform by the transform device, to generate an image representing distribution of the perceived color, thereby correlating a color system of psycho-physical color (for example, the XYZ color system) and a color system of perceived color (for example, the L*a*b* color system) to each other without setting standard light.

12 Claims, 17 Drawing Sheets

OTHER PUBLICATIONS

"PCT Application No. PCT/JP2006/323822, International Search Report mailed Jan. 16, 2007", 2 pgs.

"PCT Application No. PCT/JP2006/323822, Written Opinion mailed Jan. 16, 2007", 4 pgs.

Nakamura, Y., "Bi-directional Conversion Method Between Luminance and Brightness Images Using Wavelet Transform—Brightness Prediction Based on Luminance Contrast (Part 3)", *J. Illum. Engng. Inst. Jpn.*, 90(2), (2006),97-101.

* cited by examiner

| level | image |
|---|---|
| 0 | a image |
| -1 | Ha(-1), Va(-1), Da(-1) |
| -2 | Ha(-2), Va(-2), Da(-2) |
| -3 | Ha(-3), Va(-3), Da(-3) |
| ⋮ | ⋮ |
| -7 | Aa(-7), Ha(-7), Va(-7), Da(-7) | wavelet resolution ↓

Levels -1 through -7: sub band image (b)

| level | image |
|---|---|
| 0 | b image |
| -1 | Hb(-1), Vb(-1), Db(-1) |
| -2 | Hb(-2), Vb(-2), Db(-2) |
| -3 | Hb(-3), Vb(-3), Db(-3) |
| ⋮ | ⋮ |
| -7 | Ab(-7), Hb(-7), Vb(-7), Db(-7) | wavelet resolution ↓

Levels -1 through -7: sub band image

| | level | coefficient | |
|---|---|---|---|
| a ↓ RG | -1 | 301.0107 | ⎫ |
| | -2 | 276.9817 | ⎪ |
| | -3 | 406.345 | ⎪ C₁ |
| | -4 | 201.4341 | ⎬ |
| | -5 | 255.7211 | ⎪ |
| | -6 | 262.3667 | ⎪ |
| | -7 | 289.6945 | ⎭ |
| | | 71.03899 | ← C₂ |

(b)

| | level | coefficient | |
|---|---|---|---|
| b ↓ RG | -1 | -2.00875 | ⎫ |
| | -2 | 3.959419 | ⎪ |
| | -3 | -11.7214 | ⎪ C₃ |
| | -4 | 16.26009 | ⎬ |
| | -5 | 8.040518 | ⎪ |
| | -6 | 2.465803 | ⎪ |
| | -7 | 5.283779 | ⎭ |
| | | 1.959757 | ← C₄ |

(c)

| | level | coefficient | |
|---|---|---|---|
| a ↓ RG | -1 | 69.86957 | ⎫ |
| | -2 | 74.46947 | ⎪ |
| | -3 | 56.95601 | ⎪ C₅ |
| | -4 | 81.15051 | ⎬ |
| | -5 | 64.19648 | ⎪ |
| | -6 | 53.59094 | ⎪ |
| | -7 | 58.33945 | ⎭ |
| | | 17.63293 | ← C₆ |

(d)

| | level | coefficient | |
|---|---|---|---|
| b ↓ RG | -1 | 85.35255 | ⎫ |
| | -2 | 81.70391 | ⎪ |
| | -3 | 94.92692 | ⎪ C₇ |
| | -4 | 75.94577 | ⎬ |
| | -5 | 76.78418 | ⎪ |
| | -6 | 78.93447 | ⎪ |
| | -7 | 79.75055 | ⎭ |
| | | 25.81473 | ← C₈ |

| level | image |
|---|---|
| 0 | RG image |
| -1 | $H_{RG}(-1)$, $V_{RG}(-1)$, $D_{RG}(-1)$ |
| -2 | $H_{RG}(-2)$, $V_{RG}(-2)$, $D_{RG}(-2)$ |
| ⋮ | ⋮ |
| -6 | $H_{RG}(-6)$, $V_{RG}(-6)$, $D_{RG}(-6)$ |
| -7 | $A_{RG}(-7)$, $H_{RG}(-7)$, $V_{RG}(-7)$, $D_{RG}(-7)$ | wavelet synthesis ↑ levels −1 through −7: sub band image (b)

| level | image |
|---|---|
| 0 | BY image |
| -1 | $H_{BY}(-1)$, $V_{BY}(-1)$, $D_{BY}(-1)$ |
| -2 | $H_{BY}(-2)$, $V_{BY}(-2)$, $D_{BY}(-2)$ |
| ⋮ | ⋮ |
| -6 | $H_{BY}(-6)$, $V_{BY}(-6)$, $D_{BY}(-6)$ |
| -7 | $A_{BY}(-7)$, $H_{BY}(-7)$, $V_{BY}(-7)$, $D_{BY}(-7)$ | wavelet synthesis ↑ levels −1 through −7: sub band image (a)

(b)

(a)

| | | contrast amount (logCx) | | | | |
|---|---|---|---|---|---|---|
| | | 3 | 2 | 1 | -1 | -2 |
| X value of object | 51.0 X6 | O | O | O | | |
| | 44.7 X5 | O | O | O | O | |
| | 39.2 X4 | O | O | O | O | O |
| | 34.4 X3 | | O | O | O | O |
| | 30.2 X2 | | | O | O | O |

(b)

| | | contrast amount (logCz) | | | | |
|---|---|---|---|---|---|---|
| | | 3 | 2 | 1 | -1 | -2 |
| Z value of object | 86.5 Z6 | O | O | O | | |
| | 57.7 Z5 | O | O | O | O | |
| | 38.4 Z4 | O | O | O | O | O |
| | 17.1 Z3 | | | O | O | O |
| | 11.4 Z2 | | | O | O | O |

Fig.18

*conditions at uniform field of view, with XYZ being varied*

| visual object | | | background 1 | | | size of visual object |
|---|---|---|---|---|---|---|
| X | Y | Z | X | Y | Z | |
| 38.2311 | 74.45 | 13.14452 | 38.2311 | 74.45 | 13.14452 | 180 |
| 40.14648 | 29.15 | 11.27521 | 40.14648 | 29.15 | 11.27521 | 180 |
| 37.07673 | 69.3 | 34.33269 | 37.07673 | 69.3 | 34.33269 | 180 |
| 36.43198 | 24.95 | 37.76807 | 36.43198 | 24.95 | 37.76807 | 180 |
| 49.9078 | 65.45 | 115.6875 | 49.9078 | 65.45 | 115.6875 | 180 |
| 53.49666 | 30.56667 | 121.9108 | 53.49666 | 30.56667 | 121.9108 | 180 |
| 38.2482 | 71.7 | 13.03636 | 32.80051 | 26.2 | 8.351671 | 20 |
| 40.02207 | 30.9 | 11.25878 | 35.35961 | 74 | 12.15107 | 20 |
| 38.214 | 77.2 | 13.25267 | 32.12693 | 67.7 | 11.33892 | 20 |
| 40.27089 | 27.4 | 11.29164 | 33.97358 | 26.6 | 8.338342 | 20 |
| 37.25205 | 68.6 | 34.72172 | 40.85781 | 23.7 | 58.87969 | 20 |
| 36.68 | 26.2 | 37.88923 | 38.40401 | 62.8 | 56.18947 | 20 |
| 36.90141 | 70 | 33.94366 | 37.84725 | 62.3 | 55.60275 | 20 |
| 36.18395 | 23.7 | 37.64691 | 45.12953 | 26 | 63.58549 | 20 |
| 47.65836 | 62 | 110.9822 | 33.35599 | 27.3 | 35.47077 | 20 |
| 60.13822 | 35.9 | 132.6242 | 34.8629 | 66 | 32.20161 | 20 |
| 47.89241 | 64.3 | 109.5317 | 34.7936 | 66.4 | 31.6064 | 20 |
| 53.82 | 29.9 | 122.4869 | 33.11714 | 26.8 | 35.79714 | 20 |
| 51.77786 | 66.2 | 118.4507 | 42.27011 | 29.6 | 37.35498 | 20 |
| 52.27895 | 30.8 | 119.5526 | 37.8547 | 63.4 | 31.10438 | 20 |
| 51.72042 | 69.2 | 118.526 | 37.28108 | 62.7 | 30.37235 | 20 |
| 54.56338 | 29.8 | 125.4958 | 43.79487 | 30.5 | 37.42674 | 20 |
| 51.36545 | 65.7 | 121.8436 | 42.32222 | 29.3 | 64.02593 | 20 |
| 52.90667 | 31 | 122.76 | 38.5 | 63 | 57.59091 | 20 |
| 49.03228 | 65.3 | 114.7905 | 37.45528 | 61.6 | 55.71859 | 20 |
| 47.27273 | 26 | 108.5455 | 38.75472 | 26 | 57.88679 | 20 |

*condition at 20-degree field of view, with XYZ being varied*

(a)

(b)

IMAGE TRANSFORM APPARATUS AND IMAGE TRANSFORM PROGRAM

CROSS-REFERENCE TO RELATED APPLICATION

This application is a U.S. National Stage application claiming benefit of prior filed International Application PCT/JP2006/323822, filed Nov. 29, 2006, in which the International Application claims a priority date of Apr. 18, 2006 based on prior filed Japanese Patent Application No. 2006-114119, the entire contents of which are incorporated herein by reference.

TECHNICAL FIELD

The present invention relates to an image transform apparatus and an image transform program for performing transform processing between an image representing the distribution of psycho-physical color and an image representing the distribution of perceived color and for performing color management based on an image representing the distribution of perceived color.

BACKGROUND ART

To express colors, there are methods using a color system of psycho-physical color (for example, XYZ color system) and methods using a color system of perceived color (for example, L*a*b* color system). Further, regarding color of light reflected by an object (object color), a method of correlating these color systems with each other by calculation has been known (see, for example, non-patent document 1).

For example, the following calculation equations (21) to (23) are used to correlate the XYZ color system and the L*a*b* color system with each other. X0, Y0, Z0 are tristimulus values (Y0=100) of color of a perfect reflecting diffuser illuminated by standard light. The standard light is light whose spectral distribution is known (for example, light D65). X, Y, and Z represent tristimulus values of color of an object illuminated by the same standard light, L* represents a Munsell value (whiteness), a* represents perceived chromaticity in which hue and chroma of red-green are taken into consideration, and b* represents perceived chromaticity in which hue and chroma of yellow-blue are taken into consideration.

$$L^* = 116(Y/Y0)^{1/3} \tag{21}$$

$$a^* = 500[(X/X0)^{1/3} - (Y/Y0)^{1/3}] \tag{22}$$

$$b^* = 200[(Y/Y0)^{1/3} - (Z/Z0)^{1/3}] \tag{23}$$

Non-patent document 1: CIE Pub. No. 15.2 (1986): Colorimetry. 3rd ed., Bureau Central de la CIE.

DISCLOSURE

Problems to be Solved

However, the above method cannot correlate the XYZ color system and the L*a*b* color system with each other unless the standard light is set. Therefore, in a case where the standard light cannot be set such as, for example, in a case of an object illuminated in a real living environment (for example, in a case where one is seeing a computer screen in a room illuminated by some light), it has not been possible to correlate these color systems with each other.

It is an object of the present invention to provide an image transform apparatus and an image transform program capable of correlating a color system of psycho-physical color (for example, the XYZ color system) and a color system of perceived color (for example, the L*a*b* color system) with each other without setting standard light and also enabling color management based on an image representing the distribution of perceived color.

Means for Solving the Problems

An image transform apparatus of the present invention includes: a resolution device performing wavelet resolution based on an image representing distribution of psycho-physical color to generate sub band images at one resolution level or more; a transform device transforming values of pixels of the sub band images from values of the psycho-physical color to values of perceived color based on a predetermined relation between the psycho-physical color and the perceived color; and a synthesis device performing wavelet synthesis based on the sub band images at one resolution level or more resulting from the transform by the transform device, to generate an image representing distribution of the perceived color.

Preferably, the image representing the distribution of the psycho-physical color is three images corresponding to tristimulus values of a color system of the psycho-physical color respectively, and the image representing the distribution of the perceived color is two images corresponding to two kinds of perceived chromaticities of a color system of the perceived color respectively.

Preferably, the resolution device generates first ones of the sub band images based on an X image and a Y image and generates second ones of the sub band images based on the Y image and a Z image, the X, Y, and Z images being corresponding to stimulus values of an XYZ color system respectively, and after transforming values of pixels of the first sub band images to values of the perceived color and transforming values of pixels of the second sub band images to values of the perceived color, the transform device adds results of the transforms at the same resolution level to generate the sub band images as objects of the wavelet synthesis.

Preferably, the transform device generates third sub band images as the objects of the wavelet synthesis based on the relation of RG perception in which hue and chroma of red-green are taken into consideration and generates fourth sub band images as the objects of the wavelet synthesis based on the relation of BY perception in which hue and chroma of yellow-blue are taken into consideration, and the synthesis device performs the wavelet synthesis of the third sub band images to generate an image representing distribution of color components of the RG perception, and performs wavelet synthesis of the fourth sub band images to generate an image representing distribution of color components of the BY perception.

Preferably, the resolution device uses an orthogonal wavelet to perform the wavelet resolution, and the synthesis device uses the orthogonal wavelet to perform the wavelet synthesis.

Preferably, the orthogonal wavelet is a substantially symmetrical function.

Preferably, the image transform apparatus further includes: a second resolution device performing wavelet resolution based on the image representing the distribution of the perceived color, which is generated by the synthesis device, to generate sub band images at one resolution level or more; a second transform device transforming values of pixels of the sub band images generated by the second resolution device, from values of the perceived color to values of the psycho-physical color based on the relation; and a second synthesis device performing wavelet synthesis based on the sub band images at one resolution level or more resulting from the transform by the second transform device, to generate an image representing distribution of the psycho-physical color.

Preferably, the image transform apparatus further includes: an obtaining device obtaining information indicating an ambient environment of an output medium outputting the image representing the distribution of the psycho-physical color; and an inverse transform device inverse-transforming the image representing the distribution of the perceived color, which is generated by the synthesis device, to an image representing distribution of the psycho-physical color, based on the information indicating the ambient environment.

Preferably, the image transform apparatus further includes a calculation device calculating an output value in the output medium, based on the image representing the distribution of the psycho-physical color, which is generated by the inverse-transform device.

An image transform program of the present invention is operable to cause a computer to execute: a resolution procedure for performing wavelet resolution based on an image representing distribution of psycho-physical color to generate sub band images at one resolution level or more; a transform procedure for transforming values of pixels of the sub band images from values of the psycho-physical color to values of perceived color based on a predetermined relation between the psycho-physical color and the perceived color; and a synthesis procedure for performing wavelet synthesis based on the sub band images at one resolution level or more resulting from the transform in the transform procedure, to generate an image representing distribution of the perceived color.

Preferably, the image transform program is operable to cause the computer to further execute: an obtaining procedure for obtaining information indicating an ambient environment of an output medium outputting the image representing the distribution of the psycho-physical color; and an inverse-transform procedure for inverse-transforming the image representing the distribution of the perceived color, which is generated in the synthesis procedure, to an image representing distribution of the psycho-physical color, based on the information indicating the ambient environment.

Preferably, the image transform program is operable to cause the computer to further execute a calculation procedure for calculating an output value in the output medium, based on the image representing the distribution of the psycho-physical color, which is generated in the inverse-transform procedure.

Effect

According to the image transform apparatus and the image transform program of the present invention, it is possible to correlate a color system of psycho-physical color (for example, the XYZ color system) and a color system of perceived color (for example, the L*a*b* color system) to each other without setting standard light, and to perform color management based on an image representing the distribution of perceived color.

BRIEF DESCRIPTION OF THE DRAWINGS

FIG. 5 are explanatory charts of sub band images generated by the wavelet resolution:

FIG. 6 are charts showing examples of coefficients $C_1$~$C_8$ representing a relation between psycho-physical color and perceived color;

FIG. 7 are explanatory charts of the sub band images resulting from coefficient processing;

FIG. 18 is a chart showing added conditions; and

DETAILED DESCRIPTION OF THE EMBODIMENTS

Hereinafter, an embodiment of the present invention will be described in detail with reference to the drawings.

Here, correlating an XYZ color system and an L*a*b* color system to each other will be described as an example.

The XYZ color system is one of color systems of psycho-physical color (a color system based on a photometric quantity), and expresses colors by means of tristimulus values (X, Y, Z). Three images (X image, Y image, Z image) corresponding to the tristimulus values (X, Y, Z) are images representing the distribution of psycho-physical color, and they will be generically referred to as "luminance/chromaticity images" in the description below.

The L*a*b* color system is one of color systems of perceived color (a color system based on a reflection property), and expresses colors by means of two kinds of perceived chromaticities (a*, b*). Two images (RG image, BY image) corresponding to the perceived chromaticities (a*, b*) are images representing the distribution of perceived color, and will be generically called "color sensation images" in the description below.

Figure 1:
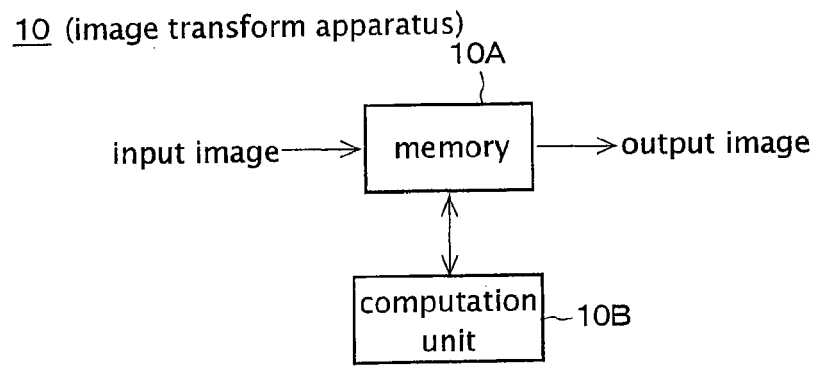
FIG. 1 is a block diagram showing a rough structure of an image transform apparatus 10 of this embodiment.

An image transform apparatus 10 (FIG. 1) of this embodiment is a computer having an image transform program installed therein, and includes: a memory 10A storing input images to be processed and output images resulting from the processing; and a computation unit 10B executing arithmetic processing for image transform according to a predetermined procedure. To install the image transform program into the computer, a recording medium (CD-ROM or the like) in which the image transform program is recorded can be used.

Alternatively, a carrier wave (containing the image transform program) downloadable via the Internet may be used.

First, the processing to transform luminance/chromaticity images (X image, Y image, Z image) of the XYZ color system to color sensation images (RG image, BY image) of the L*a*b* color system will be described according to the procedure of the flowchart shown in FIG. 2. A relation between the luminance/chromaticity images (X image, Y image, Z image) and the color sensation images (RG image, BY image) is shown in FIG. 3.

Figure 2:
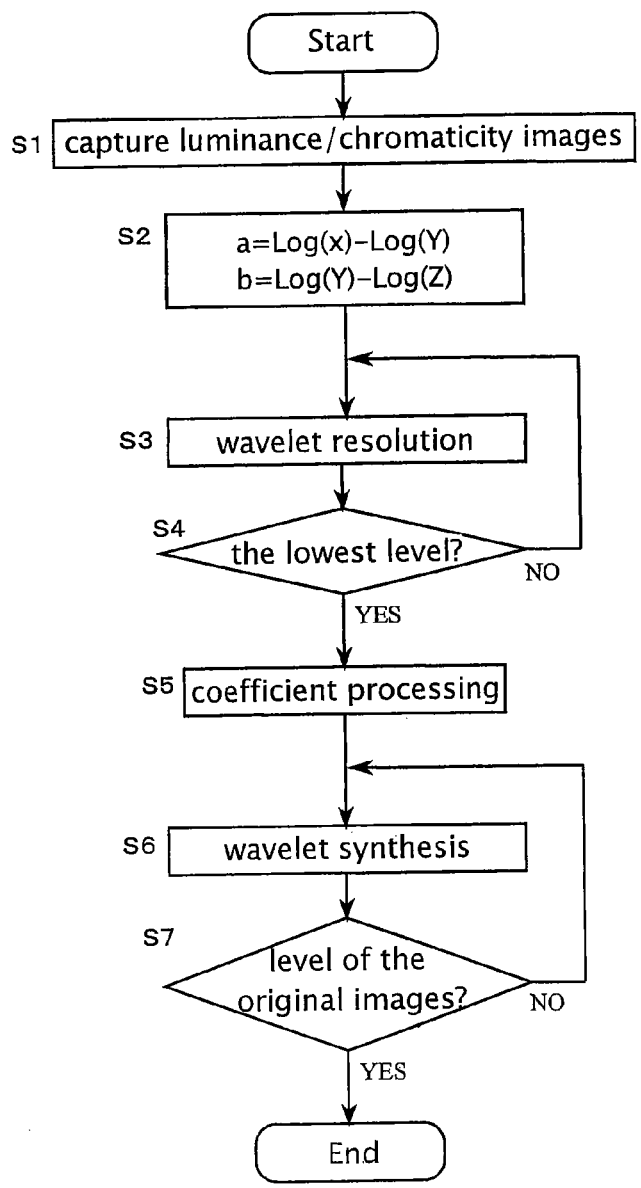
FIG. 2 is a flowchart showing the procedure for image transform.
Figure 3:
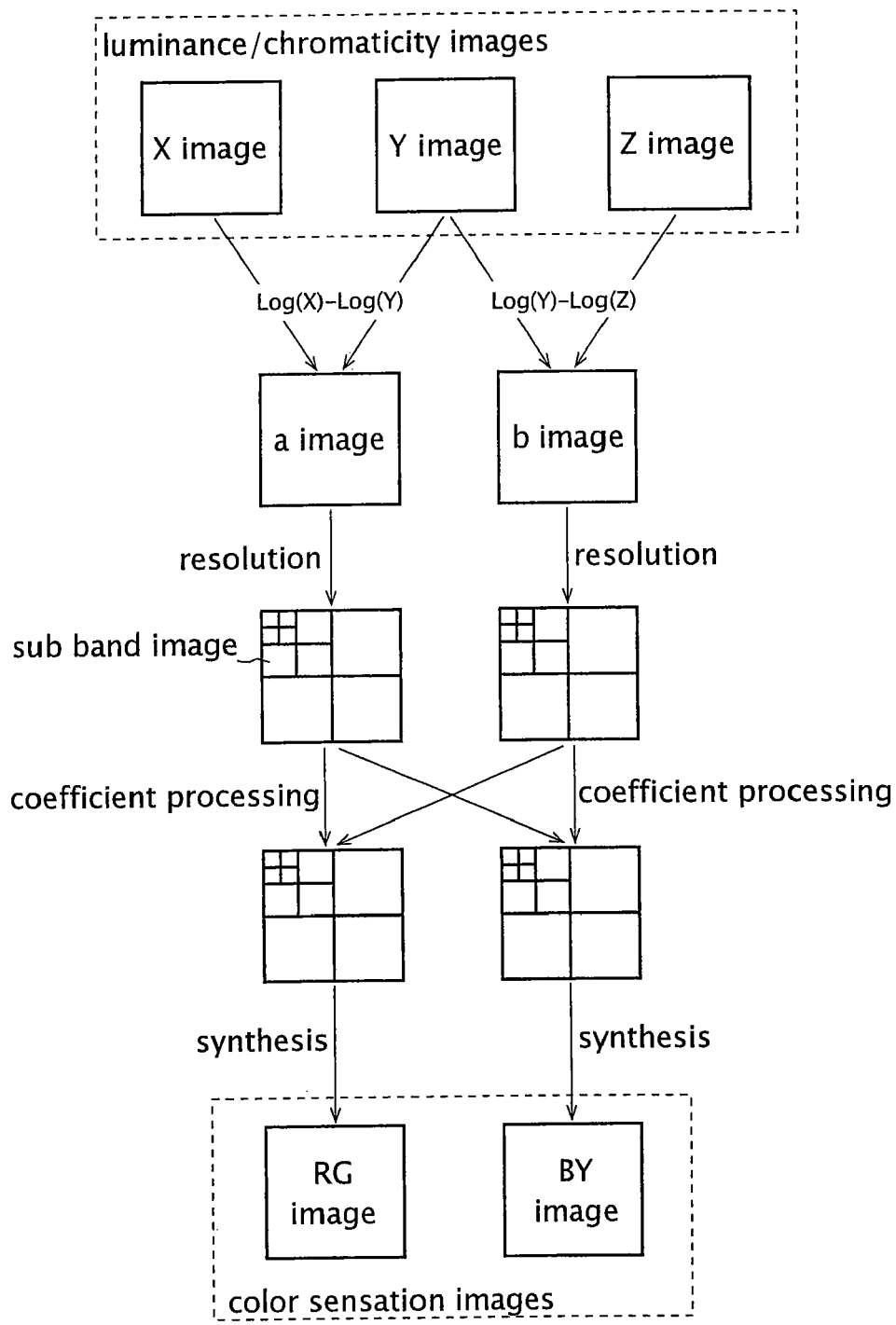
FIG. 3 is a chart showing a relation between luminance/chromaticity images (X image, Y image, Z image) and color sensation images (RG image, BY image)

At Step S1 in FIG. 2, the image transform apparatus 10 of this embodiment captures, into the memory 10A, the luminance/chromaticity images (X image, Y image, Z image) to be processed. The luminance/chromaticity images (X image, Y image, Z image) are images of the XYZ color system to which an image of the RGB color system outputted from, for example, a digital camera has been transformed by a known method, and represent object color (photometric quantity for convenience sake) under illumination in a real living environment. The Y image among the luminance/chromaticity images corresponds to a luminance image.

Next (Step S2), the computation unit 10B of the image transform apparatus 10 calculates logarithms of pixel values of the luminance/chromaticity images (X image, Y image, Z image), and thereafter, finds a difference for each pixel between the X image and the Y image (both are logarithmic images) to generate an a image, and finds a difference for each pixel between the Y image and the Z image (both are logarithmic images) to generate a b image. Though being difference images of the X image, the Y image, and the Z image, these a image and b image represent the distribution of psycho-physical color similarly to the X image, the Y image, and the Z image.

Figure 4:
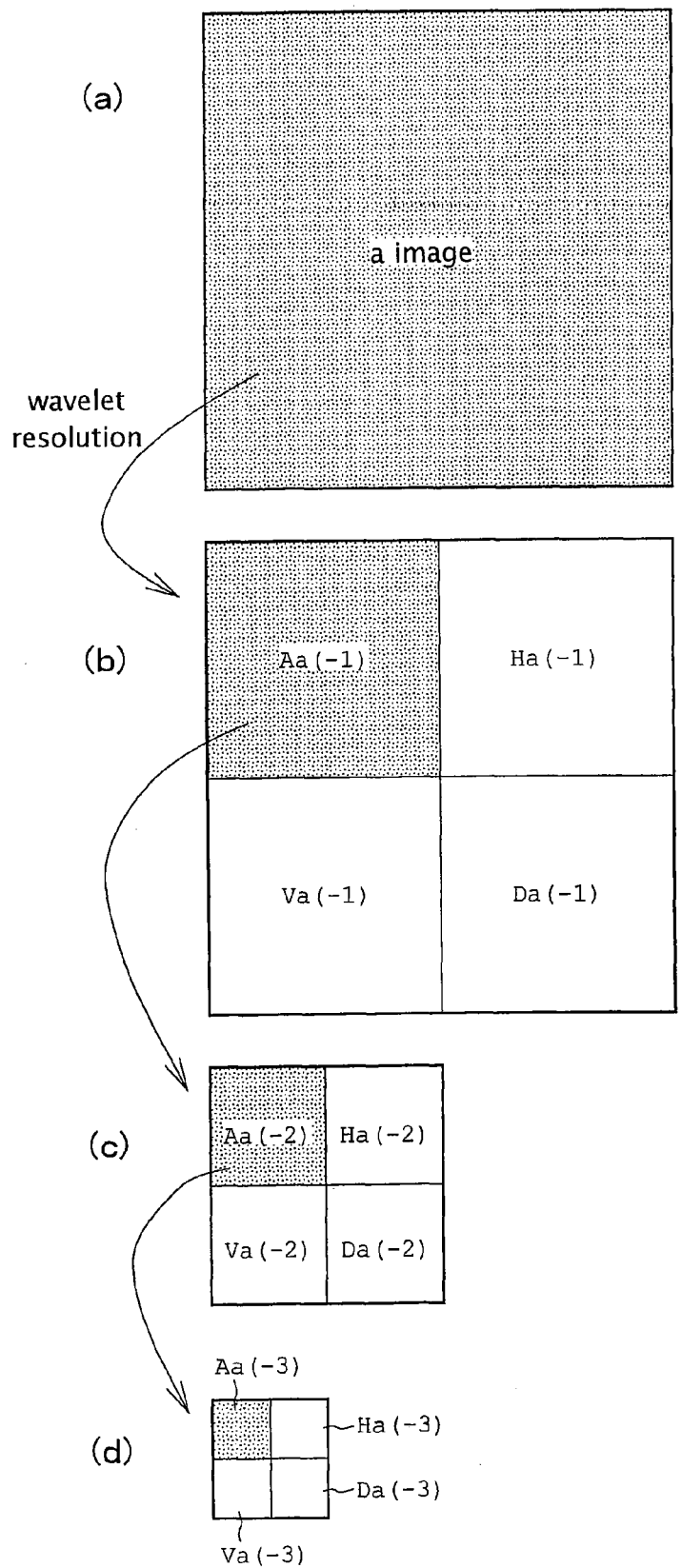
FIG. 4 is an explanatory chart of wavelet resolution.

Then, at subsequent Step S3, wavelet resolution is applied to the a image by using an orthogonal wavelet (for example, symlet 6) (FIG. 4). This wavelet resolution is resolution from level of the a image in FIG. 4($a$) as an original image (0 level) to −1 level. This processing generates four sub band images Aa(−1), Ha(−1), Va(−1), and Da(−1) at −1 level shown in FIG. 4($b$).

The sub band image Aa(−1) is a low-frequency component extracted from changes in pixel value in the a image and can be thought to be an approximate image to the a image. The other sub band images Ha(−1), Va(−1), and Da(−1) are a horizontal high-frequency component, a vertical high-frequency component, and a high-frequency component of oblique direction, respectively, extracted from the changes in pixel value in the a Image. The number of pixels of each of the sub band images Aa(−1), Ha(−1), Va(−1), Da(−1) is ¼ of that of the a image.

Next (Step S4), the image transform apparatus 10 determines whether or not the aforesaid wavelet resolution has reached the lowest level, and if the lowest level has not been reached, returns to the processing at Step S3 to repeat the wavelet resolution while the level is lowered one by one. In this embodiment, the lowest level is, for example, −7 level. In this case, the processing at Step S3 (wavelet resolution) is repeated 7 times.

The second wavelet resolution is wavelet resolution from −1 level (FIG. 4($b$)) to −2 level (FIG. 4($c$)) and is applied to the sub band image Aa(−1) which is the low-frequency component at −1 level. As a result, four sub band images Aa(−2), Ha(−2), Va(−2), and Da(−2) at −2 level are generated. The sub band image Aa(−2) is a low-frequency component extracted from changes in pixel values in the sub band image Aa(−1), and can be thought to be an approximate image to the a image similarly to the sub band image Aa(−1). The other sub band images Ha(−2), Va(−2), Da(−2) are a horizontal high-frequency component, a vertical high-frequency component, and a high-frequency component of oblique direction, respectively, extracted from the changes in pixel value in the sub band image Aa(−1).

Compared with the first wavelet resolution (FIG. 4($a$)→($b$)), the second wavelet resolution (FIG. 4($b$)→(c)) can extract a lower-frequency (rougher) change in pixel value. Likewise, the wavelet resolution at and after the third time generates four sub band images Aa(−3), Ha(−3), Va(−3), Da(−3) at −3 level from the sub band image Aa(−2) which is the low frequency component at −2 level (FIG. 4($d$)), and as the level goes down, rougher changes in pixel value are sequentially extracted. Then, when four sub band images Aa(−7), Ha(−7), Va(−7), Da(−7) at the lowest −7 level are generated, the wavelet resolution for the a image is finished.

At this point in time, the wavelet resolution has been repeated seven times, and the sub band images Ha(−1), Va(−1), Da(−1), Ha(−2), Va(−2), Da(−2), . . . , Aa(−7), Ha(−7), Va(−7), Da(−7) at 7 levels shown in FIG. 5($a$) are generated from the a image and are stored in the memory 10A of the image transfer apparatus 10.

Further, in the similar manner, the wavelet resolution for the b image is also repeated. As a result, sub band images Hb(−1), Vb(−1), Db(−1), Hb(−2), Vb(−2), Db(−2), . . . , Ab(−7), Hb(−7), Vb(−7), Db(−7) at seven resolution levels shown in FIG. 5($b$) are generated from the b image and are stored in the memory 10A of the image transform apparatus 10.

Since the a image and the b image represent the distribution of psycho-physical color as described above, pixel values of the sub band images Ha(−1)~Da(−7), and Hb(−1)~Db(−7) generated by the wavelet resolution represent values of psycho-physical color.

Next (Step S5), the computation unit 10B of the image transform apparatus 10 performs the following coefficient processing based on a predetermined relation between psycho-physical color and perceived color (for example, coefficients $C_1$~$C_8$) shown in FIG. 6, in order to transform the pixel values of the sub band images Ha(−1)~Da(−7) and Hb(−1)~Db(−7) from the values of the psycho-physical color to values of perceived color.

The $C_1$~$C_8$ are decided by utilizing constancy of human color perception (characteristic that color of an object is perceived as the same color even when illuminated by different lights). The same photometric color such as psycho-physical color of an object is recognized as different colors when illuminated by different lights. On the other hand, perceived color is recognized (perceived) as the same color even when illuminated by different lights, providing that spectral reflectance of an object is the same. That is, in the case of perceived color, it is thought that its relative relation to an ambient environment is maintained. A method of deciding the coefficients $C_1$~$C_8$ will be described finally. Image resolution (visual angle per pixel) assumed in deciding the $C_1$~$C_8$ is about 1 degree.

The coefficients $C_1$, $C_2$ shown in FIG. 6($a$) represent effects that the pixel-value changes with various frequencies extracted from the a image (the sub band images Ha(−1)~Da(−7)) have on perception in which hue and chroma of red-green is taken into consideration (RG perception). The coefficients $C_3$, $C_4$ shown in FIG. 6($b$) represent effects that the pixel-value changes with various frequencies extracted from the b image (the sub band images Hb(−1)~Db(−7)) have on RG perception.

Therefore, the coefficient processing regarding RG perception (Step S5) is performed based on the following equations (1)~(4) using the coefficients $C_1$~$C_4$ for RG evaluation and prediction.

$$A_{RG}(-7)=C_2(-7) \cdot Aa(-7)+C_4(-7) \cdot Ab(-7)+6.290802 \quad (1)$$

In the equation (1), by using the coefficient $C_2(-7)$ at $-7$ level, the pixel values of the sub band image $Aa(-7)$ which is a low-frequency component at the same resolution level are transformed from the values of psycho-physical color to color values of RG perception, and by using the coefficient $C_4(-7)$ at the same level, the pixel values of the sub band image $Ab(-7)$ which is a low-frequency component at the same resolution level are transformed to color values of RG perception, and thereafter, results of these transforms are added, whereby final color values of RG perception (pixel values of the sub band image $A_{RG}(-7)$) are calculated. The sub band image $A_{RG}(-7)$ corresponds to a low-frequency component at $-7$ level of an RG image to be finally obtained (FIG. 7(a)).

$$H_{RG}(-N)=C_1(-N) \cdot Ha(-N)+C_3(-N) \cdot Hb(-N) \quad (2)$$

$$V_{RG}(-N)=C_1(-N) \cdot Va(-N)+C_3(-N) \cdot Vb(-N) \quad (3)$$

$$D_{RG}(-N)=C_1(-N) \cdot Da(-N)+C_3(-N) \cdot Db(-N) \quad (4)$$

In the equations (2)~(4), by using the coefficients $C_1(-N)$, $C_3(-N)$ at $-N$ level (N=1~7), color values of RG perception (pixel values of sub band images $H_{RG}(-N)$, $V_{RG}(-N)$, $D_{RG}(-N)$) are calculated from the pixel values (values of psycho-physical color) of the sub band images $Ha(-N)$, $Va(-N)$, $Da(-N)$, $Hb(-N)$, $Vb(-N)$, $Db(-N)$ which are high-frequency components at the same resolution level. The sub band images $H_{RG}(-N)$, $V_{RG}(-N)$, $D_{RG}(-N)$ correspond to high-frequency components at $-N$ level of the RG image to be finally obtained (FIG. 7(a)).

Figure 8:
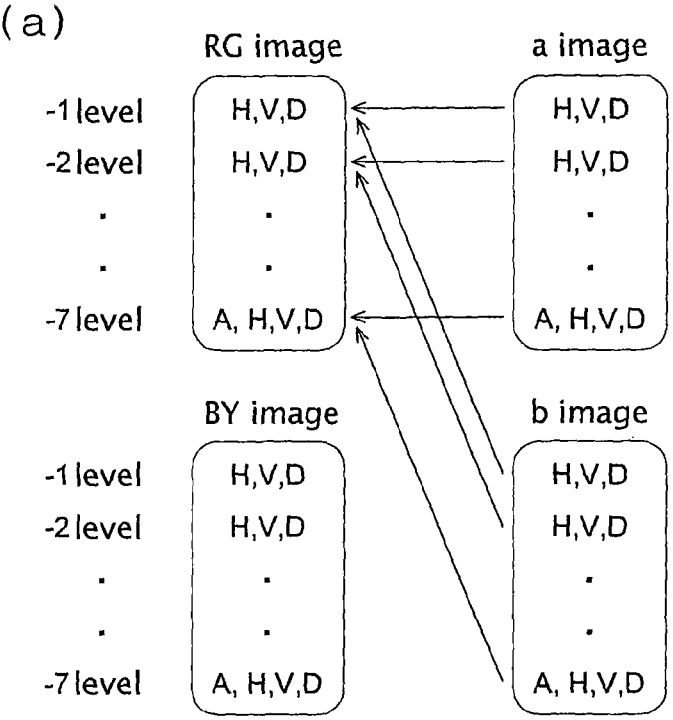
FIG. 8 are schematic explanatory charts of the coefficient processing.
Figure 8:
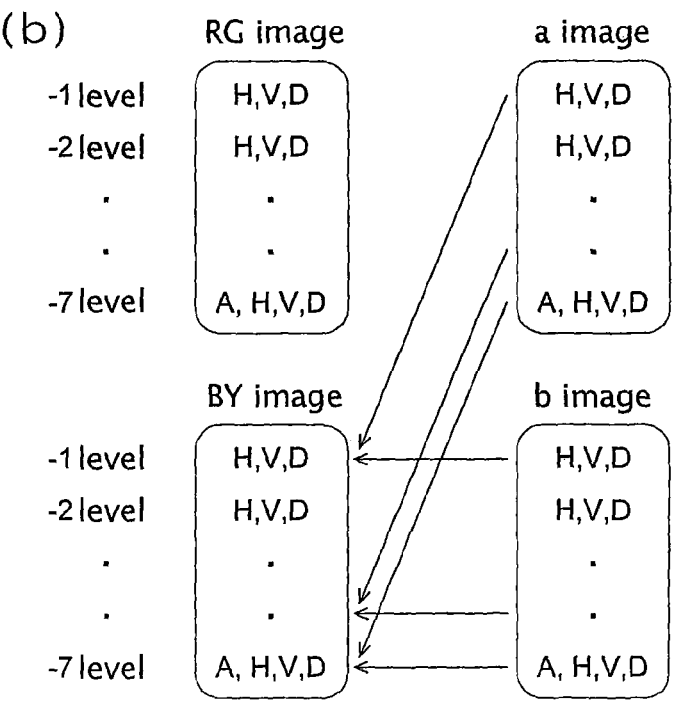

Such coefficient processing regarding RG perception (Step S5) is schematically shown in FIG. 8(a). As is understood from the equations (1)~(4) and FIG. 8(a), in the coefficient processing (Step S5), the pixel values at each level are transformed to the color values of RG perception, and thereafter, the obtained color values at the same resolution level are added. Further, the coefficient processing regarding RG perception is processing in consideration of the effects (the coefficients $C_1$~$C_4$) that the a image and the b image have on RG perception.

The coefficients $C_5$, $C_6$ shown in FIG. 6(c) represent effects that the pixel-value changes with various frequencies extracted from the a image (the sub band images $Ha(-1)$~$Da(-7)$) have on perception in which hue and chroma of yellow-blue is taken into consideration (BY perception). Further, the coefficients $C_7$, $C_8$ shown in FIG. 6(d) represent effects that the pixel-value changes with various frequencies extracted from the b image (the sub band images $Hb(-1)$~$Db(-7)$) have on BY perception.

Therefore, the coefficient processing regarding BY perception (Step S5) is performed based on the following equations (5)~(8) using the coefficients $C_5$~$C_8$ for BY evaluation and prediction shown in FIG. 6(c), (d).

$$A_{BY}(-7)=C_6(-7) \cdot Aa(-7)+C_8(-7) \cdot Ab(-7)-3.27372 \quad (5)$$

In the equation (5), by using the coefficients $C_6(-7)$, $C_8(-7)$ at $-7$ level, color values of BY perception (pixel values of a sub band image $A_{BY}(-7)$) are calculated from pixel values (values of psycho-physical color) of the sub band images $Aa(-7)$, $Ab(-7)$ which are low-frequency components at the same resolution level. The sub band image $A_{BY}(-7)$ corresponds to a low-frequency component at $-7$ level of a BY image to be finally obtained (FIG. 7(b)).

$$H_{BY}(-N)=C_5(-N) \cdot Ha(-N)+C_7(-N) \cdot Hb(-N) \quad (6)$$

$$V_{BY}(-N)=C_6(-N) \cdot Va(-N)+C_7(-N) \cdot Vb(-N) \quad (7)$$

$$D_{BY}(-N)=C_5(-N) \cdot Da(-N)+C_7(-N) \cdot Db(-N) \quad (8)$$

In the equations (6)~(8), by using the coefficients $C_5(-N)$, $C_7(-N)$ at $-N$ level (N=1~7), color values of BY perception (pixel values of the sub band images $H_{BY}(-N)$, $V_{BY}(-N)$, $D_{BY}(-N)$) are calculated from the pixel values (values of psycho-physical color) of the sub band images $Ha(-N)$, $Va(-N)$, $Da(-N)$, $Hb(-N)$, $Vb(-N)$, $Db(-N)$ which are high-frequency components at the same resolution level. The sub band images $H_{BY}(-N)$, $V_{BY}(-N)$, $D_{BY}(-N)$ correspond to high-frequency components at $-N$ level of the BY image to be finally obtained (FIG. 7(b)).

Such coefficient processing regarding BY perception (Step S5) is schematically shown in FIG. 8(b). As is understood from the equations (5)~(8) and FIG. 8(b), in the coefficient processing (Step S5), the pixel values at each level are transformed to the color values of BY perception, and thereafter, the obtained color values at the same resolution level are added. Further, the coefficient processing regarding BY processing is processing in consideration of the effects (the coefficients $C_5$~$C_8$) that the a image and the b image have on BY perception.

Upon completion of the above-described coefficient processing (Step S5), the sub band images $H_{RG}(-1)$, $V_{RG}(-1)$, $D_{RG}(-1)$, ..., $A_{RG}(-7)$, $H_{RG}(-7)$, $V_{RG}(-7)$, $D_{RG}(-7)$ at the seven resolution levels shown in FIG. 7(a), and the sub band images $H_{BY}(-1)$, $V_{BY}(-1)$, $D_{BY}(-1)$, ..., $A_{BY}(-7)$, $V_{BY}(-7)$, $D_{BY}(-7)$ at the seven resolution levels shown in FIG. 7(b) are stored in the memory 10A of the image transform apparatus 10. Incidentally, the pixel values of the sub band images $A_{RG}(-7)$, $A_{BY}(-7)$ correspond to color values of RG perception and BY perception under uniform luminance and chromaticity. The pixel values of the sub band images $H_{RG}(-N)$, $V_{RG}(-N)$, $D_{RG}(-N)$, $H_{BY}(-N)$, $V_{BY}(-N)$, $D_{BY}(-N)$ correspond to color values of RG perception and BY perception due to contrast effects of luminance and chromaticity.

Next (Step S6), by using the same orthogonal wavelet (for example, symlet 6) used at Step S3, the computation unit 10B of the image transform apparatus 10 performs wavelet synthesis based on the sub band images $H_{RG}(-1)$~$D_{RG}(-7)$, $H_{BY}(-1)$~$D_{BY}(-7)$ at seven resolution levels which result from the coefficient processing (FIGS. 7(a), (b)). The wavelet synthesis processing is applied to the sub band images $H_{RG}(-1)$~$D_{RG}(-7)$ pertaining to RG perception and $H_{BY}(-1)$~$D_{BY}(-7)$ pertaining to BY perception.

First, for the sub band images $H_{RG}(-1)$~$D_{RG}(-7)$ pertaining to RG perception, the wavelet synthesis is applied to the four sub band images $A_{RG}(-7)$, $H_{RG}(-7)$, $V_{RG}(-7)$, $D_{RG}(-7)$ at $-7$ level. This wavelet synthesis can generate a sub band image $A_{RG}(-6)$ which is a low-frequency component at one level higher ($-6$ level).

Next (Step S7), it is determined whether or not the above wavelet synthesis has reached the level of the original images (0 level), and if the level of the original images have not been reached, back at Step S6, the wavelet synthesis is repeated while level is increased one by one. In this embodiment, since the lowest level is $-7$ level, the processing at Step S6 (wavelet synthesis) is repeated 7 times.

The second wavelet synthesis is wavelet synthesis from $-6$ level to $-5$ level, and is performed by using the sub band image $A_{RG}(-6)$ generated by the first wavelet synthesis and three sub band images $H_{RG}(-6)$, $V_{RG}(-6)$, $D_{RG}(-6)$ at $-6$ level shown in FIG. 7(a). As a result, a sub band image $A_{RG}(-5)$ which is a low-frequency component at one level higher (−5 level) can be generated.

The wavelet synthesis at and after the third time is performed in the same manner, and when a sub band image as a low-frequency component at the level of the original image (0 level) (that is, the RG image) is generated based on a sub band image $A_{RG}(-1)$ at −1 level generated by the sixth wavelet synthesis and three sub band images $H_{RG}(-1), V_{RG}(-1), D_{RG}(-1)$ at −1 level shown in FIG. 7(a), the synthesis processing of the sub band images $H_{RG}(-1) \sim D_{RG}(-1)$ pertaining to RG perception is finished.

Further, the wavelet synthesis of the sub band images $H_{BY}(-1) \sim D_{BY}(-7)$ pertaining to BY perception is also repeated in the same manner as above (FIG. 7(b)). Then, when a sub band image as a low-frequency component at the level of the original image (0 level) (that is the BY image) is generated, the synthesis processing of the sub band images $H_{BY}(-1) \sim D_{BY}(-7)$ pertaining to BY perception is also finished.

Through the above-described arithmetic processing for the image transform in FIG. 2, it is possible to transform luminance/chromaticity images of the XYZ color system (X image, Y image, Z image) to color sensation images (RG image, BY image) of the L*a*b* color system. The RG image represents the distribution of color components of RG perception, and the BY image represents the distribution of color components of BY perception.

Therefore, according to the image transform apparatus 10 of this embodiment, it is possible to predict color sensation of all points on an image having arbitrary luminance/chromaticity distribution (photometric quantity), and to correlate the XYZ color system and the L*a*b* color system with each other without setting standard light. Therefore, it is possible to correlate the XYZ color system and the L*a*b* color system with each other even on an object under illumination in a real living environment (for example, in a case where a computer screen is viewed in a room under some illumination).

Further, color systems constructed for psycho-physical color and perceived color can be combined into one color system through human color sensation. Further, it is possible to predict what human color sensation occurs when a characteristic of a light source changes (evaluation of a color rendering property).

Further, according to the image transform apparatus 10 of this embodiment, since luminance/chromaticity images (X image, Y image, Z image) are transformed to color sensation images (RG image, BY image) by the combination of the wavelet resolution and the wavelet synthesis at Step S3 and Step S6 in FIG. 2 (that is, by the application of a method of so-called discrete wavelet transform), an arithmetic load at this time can be reduced. Therefore, it is possible to obtain the color sensation images (RG image, BY image) from the luminance/chromaticity images (X image, Y image, Z image) at high speed in a very short time.

Moreover, according to the image transform apparatus 10 of this embodiment, since the orthogonal wavelet is used for the wavelet resolution and the wavelet synthesis (Steps S3, S6 in FIG. 2), an error in the arithmetic processing for the image transform can be extremely reduced. Therefore, after the above-described transform from the luminance/chromaticity images (X image, Y image, Z image) to the color sensation images (RG image, BY image), by performing inverse transform from the color sensation images to the luminance/chromaticity images with the use of the same orthogonal wavelet, it is possible to return the color sensation images to the original luminance/chromaticity images. That is, according to the image transform apparatus 10, high-speed bi-directional transform to/from the luminance/chromaticity images from/to the color sensation images is possible.

(Inverse Transform)

Here, the inverse transform from color sensation images (RG image, BY image) to luminance/chromaticity images (X image, Y image, Z image) will be described. The procedure for the inverse transform processing is reverse to the above-described procedure for the transform processing (FIG. 2~FIG. 8), and first, through the wavelet resolution of each of an RG image and a BY image, the sub band images $H_{RG}(-1) \sim D_{RG}(-7), H_{BY}(-1) \sim D_{BY}(-7)$ at seven resolution levels shown in FIG. 7 are generated.

Then, the above-described coefficient processing using the coefficients $C_1 \sim C_8$ (FIG. 6) is performed. The following equation (9) or the like is used for the coefficient processing for the inverse transform instead of the aforesaid equations (1)~(8). The equation (9) can be derived from the aforesaid equations (2), (6).

$$Hb(-N) = [H_{RG}(-N)/C_3(-N) - H_{BY}(-N)/C_5(N)] \div [ \qquad (9)$$
$$C_3(-N)/C_1(-N) - C_7(-N)/C_5(-N)]$$

Figure 9:
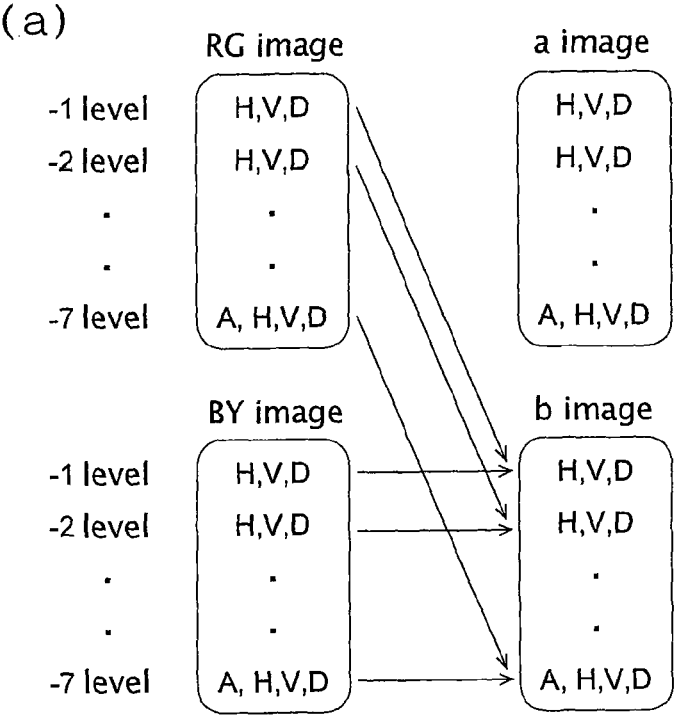
FIG. 9 are schematic explanatory charts of coefficient processing for inverse-transform.
Figure 9:
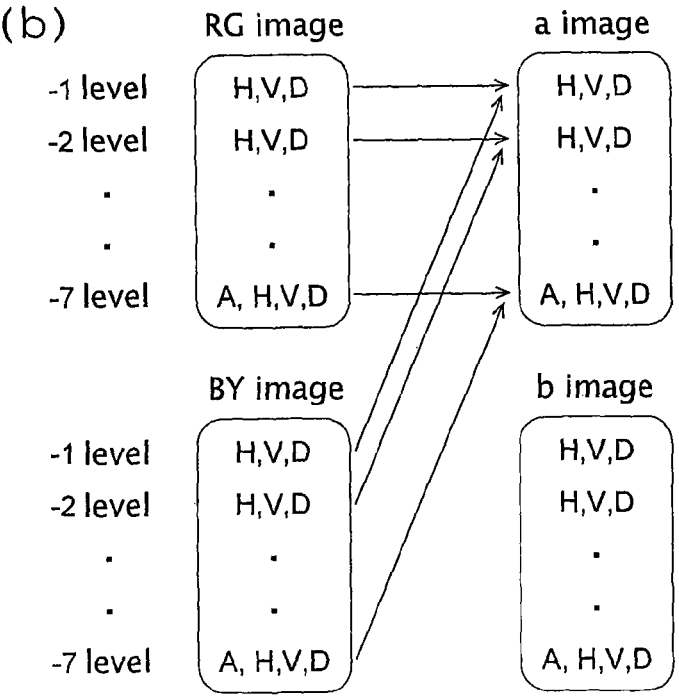

In the equation (9), by using the coefficients $C_1(-N), C_3(-N), C_5(-N), C_7(-N)$ at −N level (N=1~7), pixel values of a sub band image Hb(−N) (values of psycho-physical color) are calculated from pixel values of sub band images $H_{RG}(-N), H_{BY}(-N)$ which are high-frequency components at the same resolution level (color values of RG perception and BY perception) (see the schematic chart shown in FIG. 9(a)). The sub band image Hb(−N) corresponds to a high-frequency component at −N level of the b image (FIG. 5(b)). Regarding the other sub band images Vb(−N), Db(−N), Ab(−7) of the b image, their pixel values (values of psycho-physical color) can be calculated in the same manner.

Further, regarding the sub band images Ha(−N), Va(−N), Da(−N), Aa(−7) of the a image, their pixel values (values of psycho-physical color) can be calculated in the same manner (see, the schematic chart shown in FIG. 9(b)). The sub band images Ha(−N), Va(−N), Da(−N), Aa(−7) correspond to high-frequency components and a low-frequency component at respective resolution levels of the a image (FIG. 5(a)).

Then, upon completion of the coefficient processing, the wavelet synthesis is performed based on the sub band images Ha(−1)~Da(−7), Hb(−1)~Db(−7) at seven resolution levels to generate the a image and b image shown in FIG. 3. Then, luminance/chromaticity images (X image, Y image, Z image) can be generated from the a image and the b image in the following manner: if there is no luminance change between a pixel of interest and surroundings, by using an original Y value, or if there is luminance change, by using a luminance value which is obtained as a result of the inverse transform of luminance-brightness transform by a method described, in for example, Japanese Patent Application No. 2005-165191 (a method utilizing wavelet transform), the luminance image (Y image) is obtained and its differences from the a image and the b image are calculated by using the obtained information.

The inverse transform processing described above may be applied to color sensation images to which luminance/chromaticity images have been transformed in advance, or may be applied to color sensation images newly generated by some method. In the former case, it is preferable to use the same orthogonal wavelet (for example, symlet 6) as used for the transform from the luminance/chromaticity images to the color sensation images.

Further, according to the image transform apparatus 10 of this embodiment, since a substantially symmetrical function (for example, symlet 6) is used as the orthogonal wavelet both for the wavelet resolution and for the wavelet synthesis of the luminance/chromaticity images and the color sensation images (Steps S3, S6, and so on in FIG. 2), the transform suitable for a color sensation characteristic of human eyes (characteristic that a contrast effect of luminance/chromaticity is symmetrical with respect to the center of a field of view and has no directivity) is possible.

Further, in the image transform apparatus 10 of this embodiment, since high-speed bi-directional transform to/from the luminance/chromaticity images from/to the color sensation images described above is possible, illumination design, illumination control, and the like can be efficiently realized.

Further, the image transform apparatus 10 of this embodiment is applicable not only to a case where color of an object (psycho-physical color) under given illumination, such as an RGB image outputted from a digital camera, is transformed to perceived color, but also to a case where color of a light source, such as a monitor or a display, that itself emits light is transformed to perceived color.

Moreover, the inverse transform is also possible in the case of light source color, and luminance/chromaticity distribution necessary to arouse specific color sensation can also be presented from color sensation images at a specific point on an image of a monitor or the like. Further, objective adjustment of a color output is also possible so that a certain portion on an image is seen as the same color. Conceivable application fields are all fields where color management is necessary and all fields where evaluation based on an image output is necessary (an endoscope, a remote image, a television and the like).

(Example of Actual Color Management Based on Perceived Color)

An example of actual color management based on perceived color will be described. The description here will be given of color management, for example, in a case where an RGB image outputted from a digital camera or the like is outputted to an output medium, such as a monitor or a display, that itself emits light.

Figure 10:
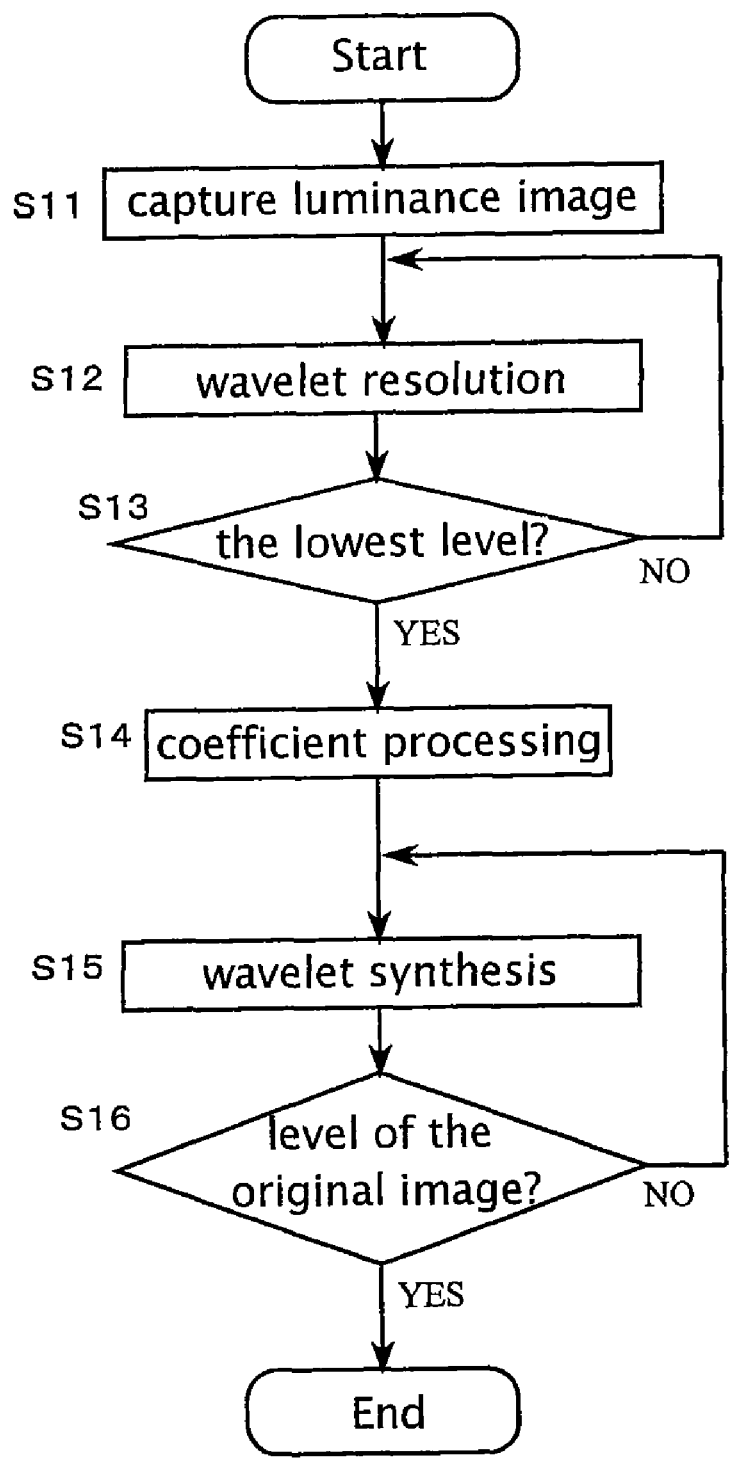
FIG. 10 is another flowchart showing the procedure for image transform.

In the color management, a brightness image is used in addition to the color sensation images (see FIG. 3) described in this embodiment. The brightness image can be obtained by, for example, the method described in Japanese Patent Application No. 2005-165191 (the method using the wavelet transform). The processing for generating the brightness image will be roughly described by using the flowchart shown in FIG. 10.

First, the image transform apparatus 10 captures a luminance image (Y image) into the memory 10A (Step S11).

Next, the computation unit 10B of the image transform apparatus 10 calculates logarithms of pixel values of the luminance image, and thereafter goes to processing at Step S12. Then, the computation unit 10B of the image transform apparatus 10 repeats the wavelet resolution of the luminance image (logarithmic image) by using an orthogonal wavelet (for example, symlet 6) up to the lowest level (Steps S12, 13).

Next, the computation unit 10B of the image transform apparatus 10 performs coefficient processing based on a predetermined relation between luminance and brightness impression (Step S14).

Next, the computation unit 10B of the image transform apparatus 10 repeats the wavelet synthesis up to the level of the original image by using the same orthogonal wavelet (for example, symlet 6) as used at Step S12 (Steps S15, 16).

Figure 11:
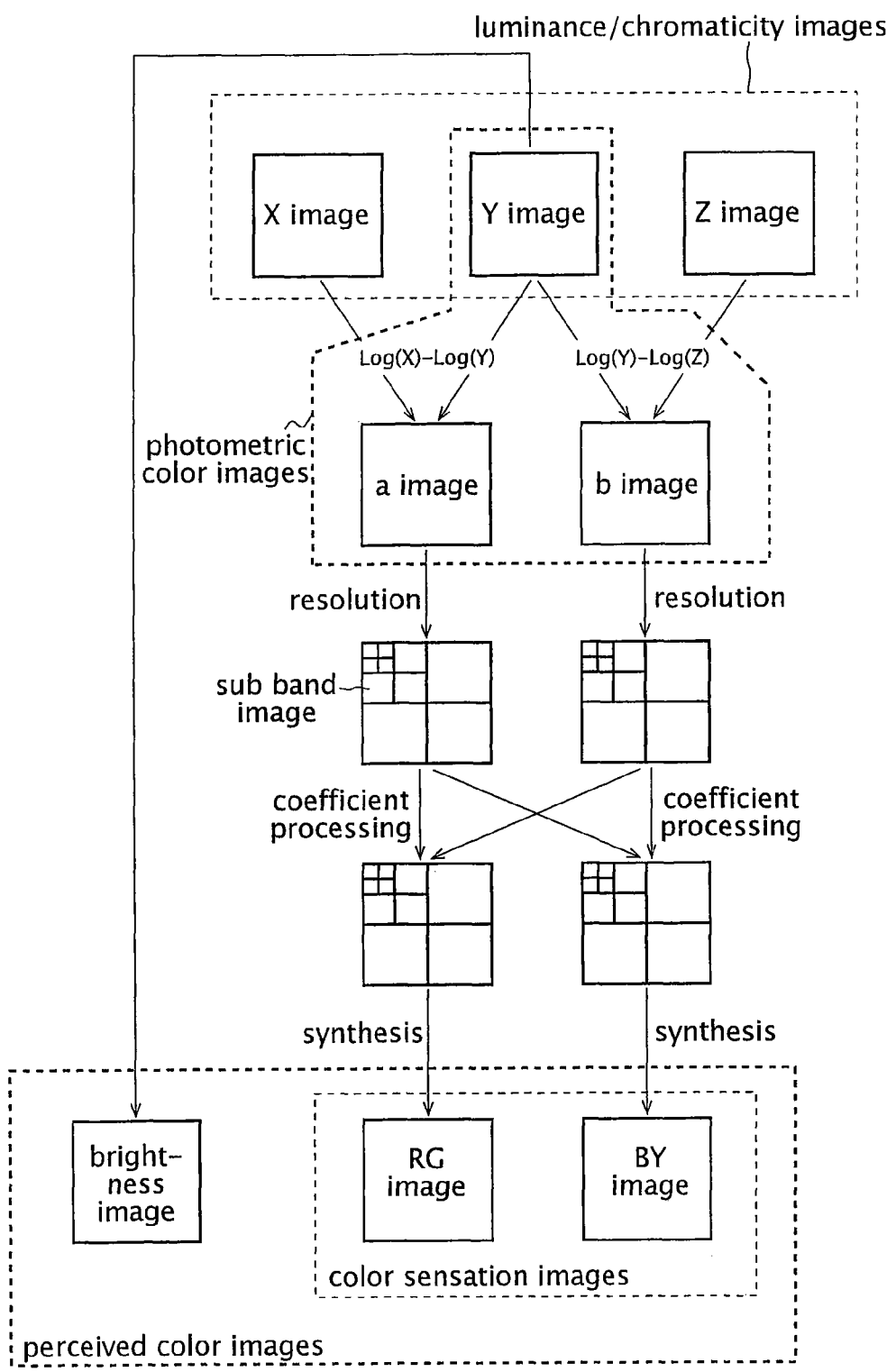
FIG. 11 is a chart showing a relation among a brightness image, luminance/chromaticity images (X image, Y image, Z image), color sensation images (RG image, BY image)

FIG. 11 shows the relation of the brightness image generated by the above-described processing with the luminance/chromaticity images (X image, Y image, Z image) and the color sensation images (RG image, Y image) which are shown in FIG. 3.

Hereinafter, the Y image, the a image, and the b image will be generically called "photometric color images", and the brightness image and the color sensation images (RG image, BY image) will be generically called "perceived color images".

Figure 12:
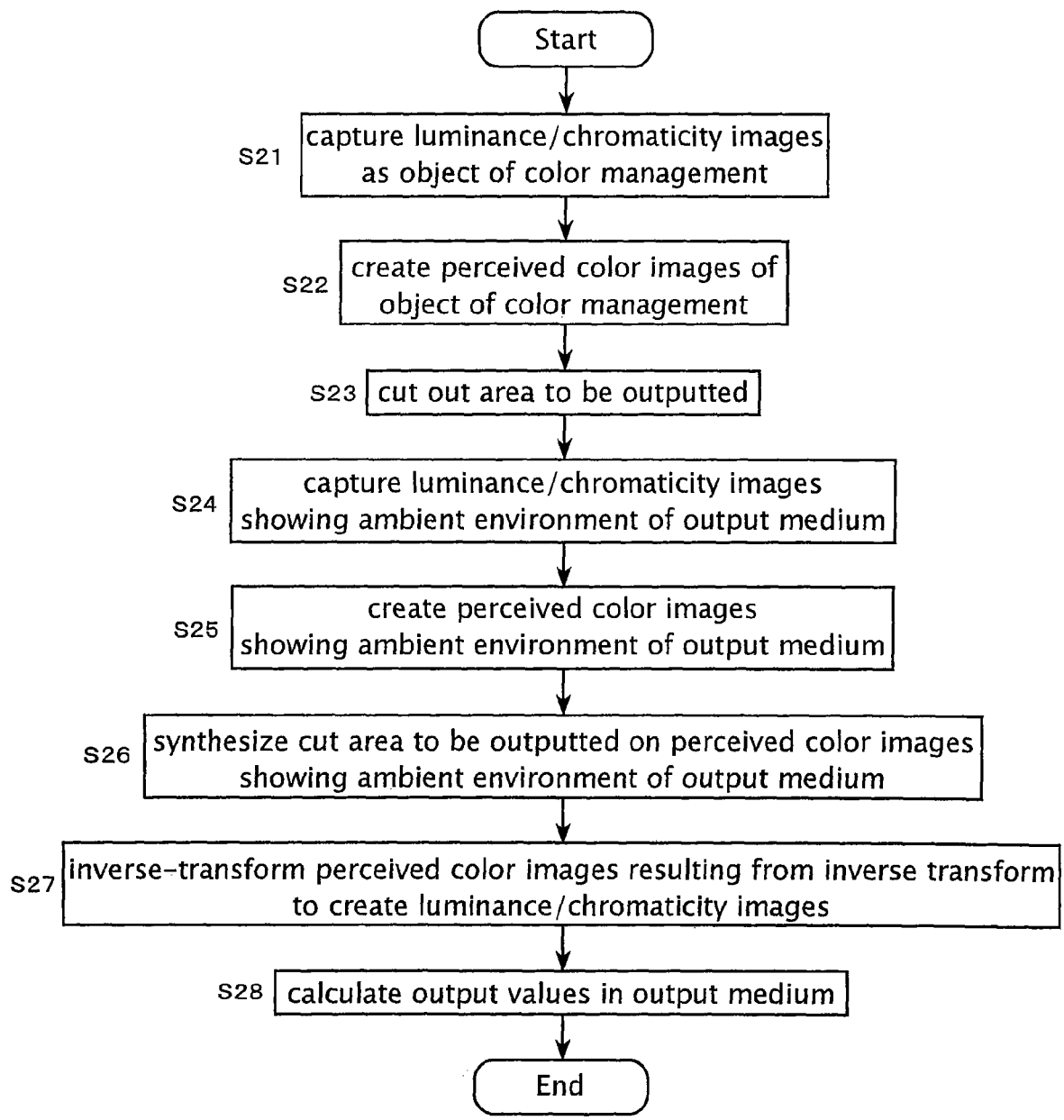
FIG. 12 is a flowchart showing the procedure for color management.

The concrete procedure for the color management will be described by using the flowchart shown in FIG. 12.

Figure 13:
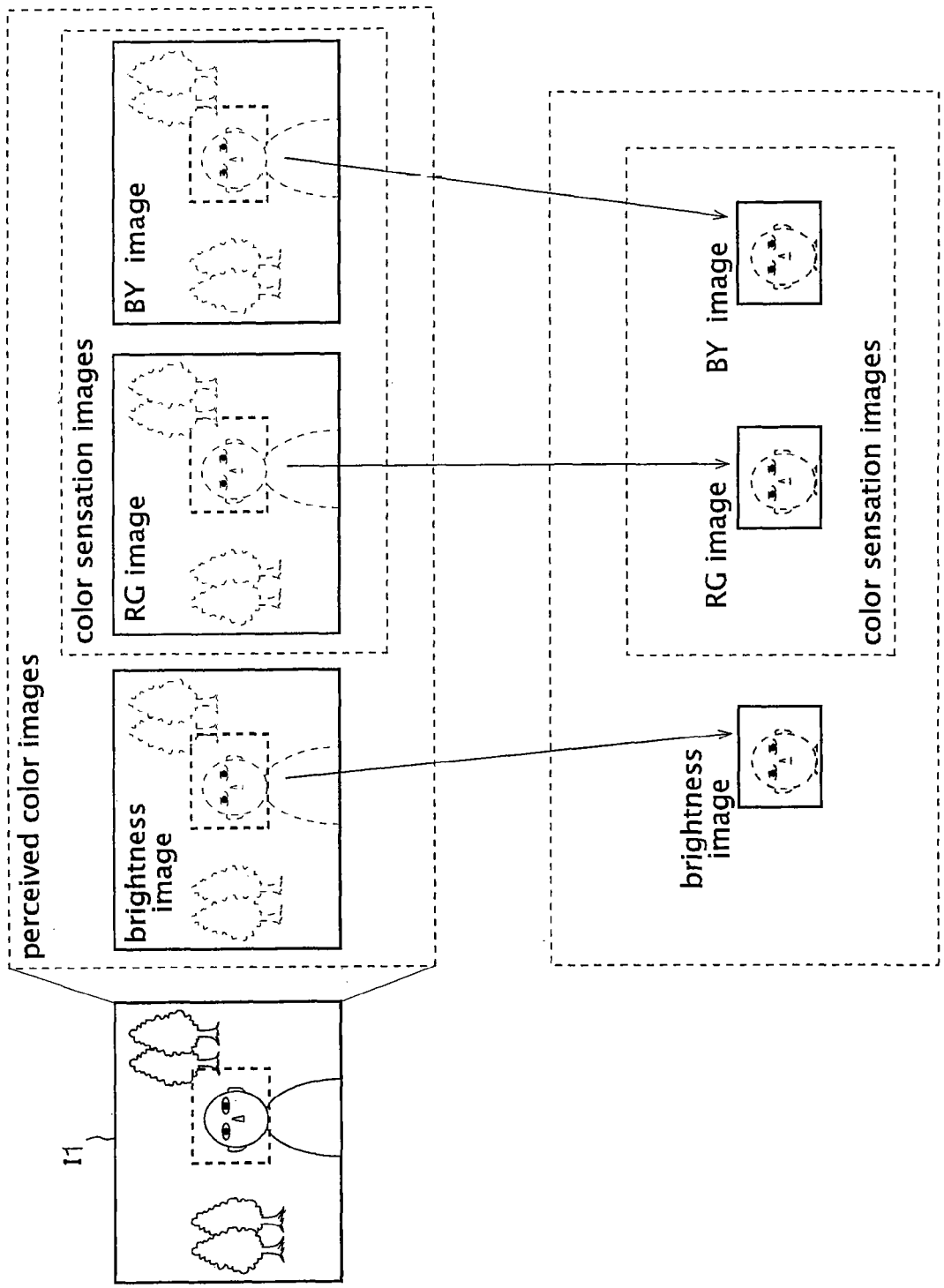
FIG. 13 is an explanatory chart of the color management.

First, the image transform apparatus 10 captures, into the memory 10A, luminance/chromaticity images as an object of the color management (an image to be outputted to an output medium) (Step S21). In the description here, an image 11 in FIG. 13 is the luminance/chromaticity images as the object of the color management.

Next, the computation unit 10B of the image transform apparatus 10 creates perceived color images from the luminance/chromaticity images 11 which is the object of the color management, according to the procedure described in this embodiment (Step S22).

The computation unit 10B of the image transform apparatus 10 cuts out an area to be outputted, from each of the perceived color images which are created from the object of the color management at Step S22 (Step S23). The area to be outputted is an area that should be outputted to the output medium (a monitor, a display, or the like), and is designated by, for example, a user's operation via a not-shown input unit of the image transform apparatus 10. Incidentally, the computation unit 10B of the image transform apparatus 10 cuts out the area to be outputted, from each of the brightness image and the color sensation images (RG image, BY image) which are the perceived color images.

Next, the image transform apparatus 10 captures, into the memory 10A, luminance/chromaticity images showing an ambient environment of the output medium (Step S24). It is assumed here that the output medium is a monitor of a computer placed on a desk, and an RGB image captured from a visual point of a user seeing this monitor is captured as the luminance/chromaticity images showing the ambient environment of the output medium. These luminance/chromaticity images contains information on the visual point of the user with respect to the output medium, the state of ambient light, and the like. An image 12 in FIG. 14 is the luminance/chromaticity images showing the ambient environment of the output medium.

The computation unit 10B of the image transform apparatus 10 creates perceived color images from the luminance/chromaticity images 12 showing the ambient environment of the output medium, according to the procedure described in this embodiment (Step S25).

Figure 14:
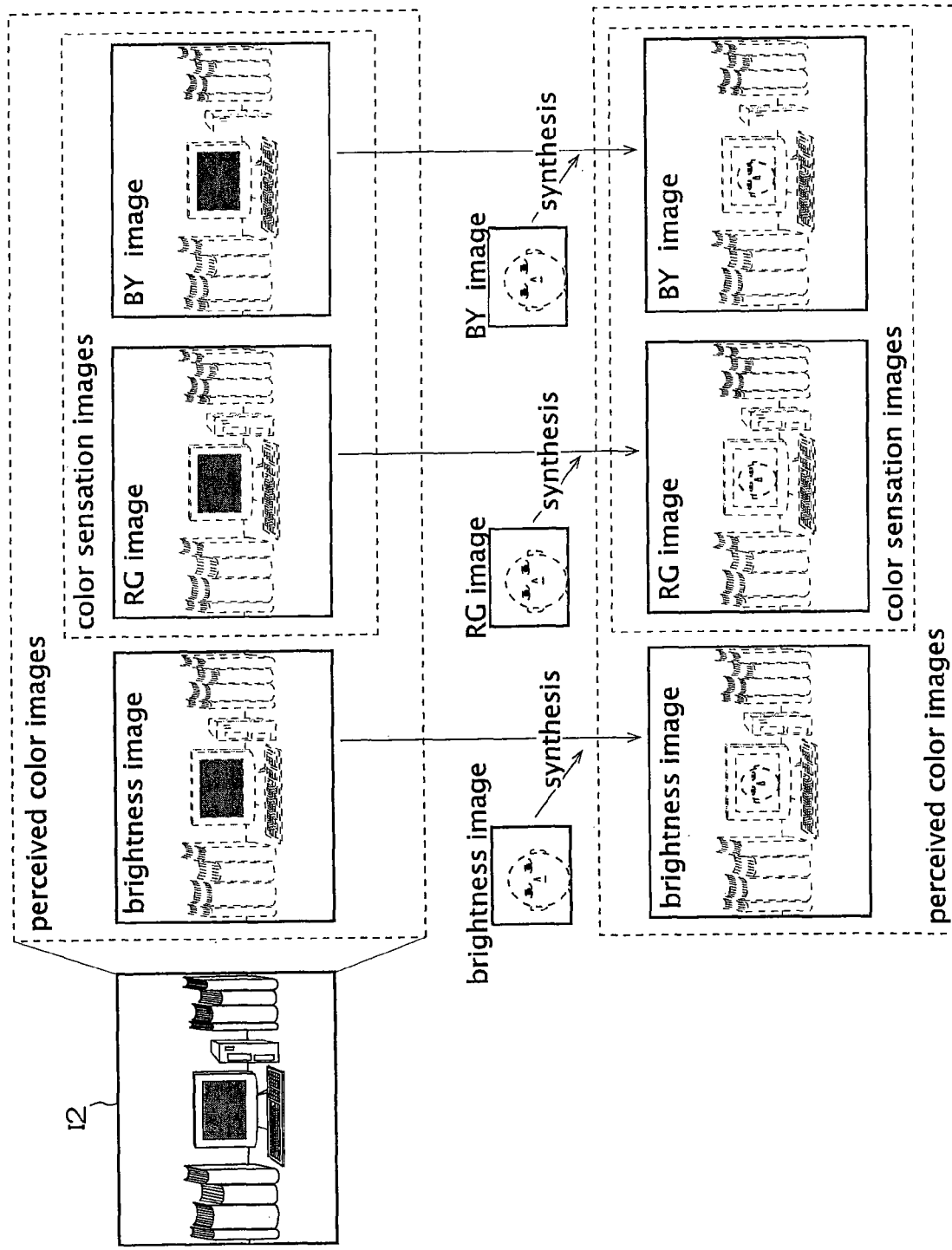
FIG. 14 is another explanatory chart of the color management.

Next, as shown in FIG. 14, the computation unit 10B of the image transform apparatus 10 synthesizes the area to be outputted in each of the perceived color images of the object of the color management, which area is cut out at Step S23, on an output portion (output portion of the monitor) of each of the perceived color images showing the ambient environment of the output medium, which images are created at Step S25 (Step S28). Incidentally, the computation unit 10B of the image transform apparatus 10 synthesizes the area to be outputted cut out from the brightness image of the object of the color management, on the brightness image out of the perceived color images showing the ambient environment of the output medium, synthesizes the area to be outputted cut out from the color sensation image (RG image) of the object of the color management, on the color sensation image (RG image) out of the perceived color images showing the ambient environment of the output medium, and synthesizes the area to be outputted cut out from the color sensation image (BY image) of the object of the color management, on the color sensation image (BY image) out of the perceived color images showing the ambient environment of the output medium. These syntheses come after the output portion of each of the perceived color images showing the ambient environment of the output medium, which images are created at Step S25, and the area to be outputted of each of the perceived color images of the object of the color management, which is cut out at Step S23, are appropriately enlarged/reduced so that their sizes match each other.

Figure 15:
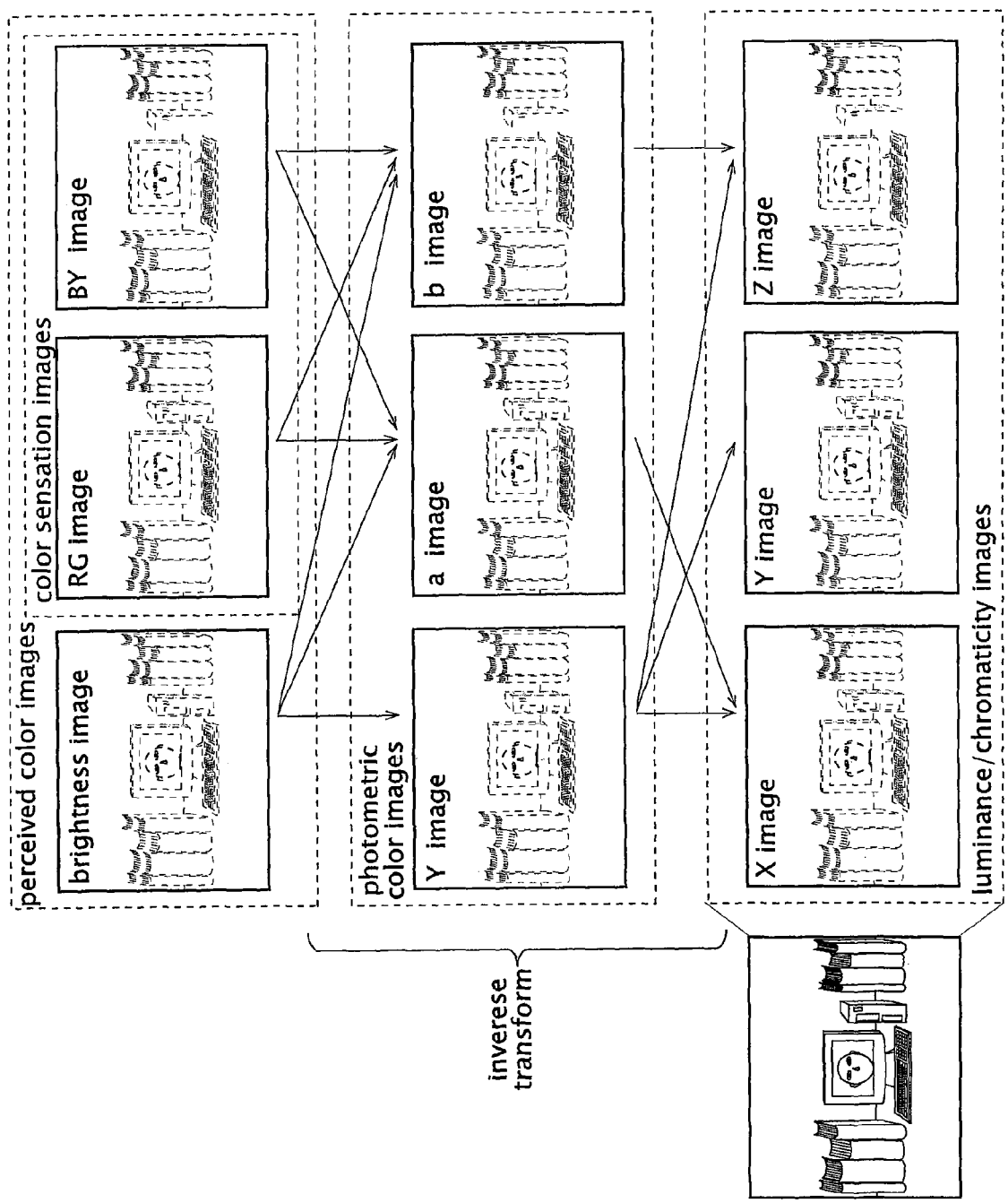
FIG. 15 is still another explanatory chart of the color management.

Then, as shown in FIG. 15, the computation unit 10B of the image transform apparatus 10 inverse-transforms the perceived color images created at Step S27 to create photometric color images, and further creates luminance/chromaticity images (Step S27). The inverse transform from the color sensation images (RG image, BY image) to the luminance/chromaticity images (X image, Y image, Z image) is performed according to the procedure described in this embodiment or the procedure described in Japanese Patent Application No. 2005-165191.

Finally, the computation unit 10B of the image transform apparatus 10 calculates output values in the output medium based on the luminance/chromaticity images created at Step S27 (Step S28).

The color management based on the images representing the distribution of perceived color can be realized by the above-described procedure. Concretely, from images showing the distribution of perceived color, the luminance/chromaticity distribution necessary for arousing specific color sensation can be presented at a specific point on an image of the output medium such as a monitor. Further, it is possible to objectively adjust color output of the output medium so that a given portion on the image can be perceived as the same color.

Incidentally, in the luminance/chromaticity images created at Step S27, there are some cases where an error from an actual photometric quantity occurs in the vicinity of the output portion of each of the perceived color images showing the ambient environment of the output medium (the output portion of the monitor). In such a case, error-corrected perceived color images showing the ambient environment of the output medium are created, and then the flow returns to Step S26. Then, images are synthesized again. By repeating such processing until the error falls within a tolerable range, more delicate color management is also enabled.

Further, the operation of cutting out the area to be outputted at Step S23 in the above-described example may be automated. An example of such design is to designate the position and size of the area to be outputted in advance and to always cut out the area to be outputted at Step S23.

Further, the above-described example shows an example where, at Step S24, the RGB image generated by image capturing is obtained as the luminance/chromaticity images showing the ambient environment of the output medium, but this embodiment is not limited to this example, provided that information indicating the ambient environment of the output medium is obtainable. For example, in the above-described color management, the information indicating the ambient environment of the output medium may be information on standard output in the output medium measured and recorded in advance. Such design makes it possible to automate the obtaining of the information showing the ambient environment of the output medium.

Further, in the above-described example, the output medium that itself emits light such as a monitor or a display is taken as an example, but the present invention is similarly applicable to color management relating to an output medium, such as a printer, observing printed matter based on the shape of reflected light. In this case, a series of the processing may be performed, for example, under the assumption of a kind of environment (for example, illumination light, user's visual point, or the like) where the printed matter is seen.

(Determination of the Coefficients $C_1 \sim C_8$)

Figures 16, 17:
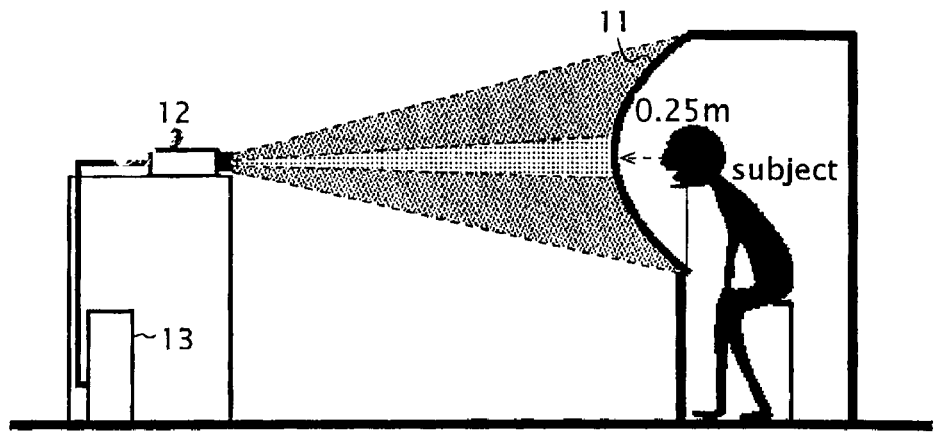
FIG. 16 is a schematic view of an experimental apparatus used for deciding the coefficients $C_1$~$C_8$.
FIG. 17 are explanatory charts of stimulus patterns.

To decide the coefficients $C_1 \sim C_8$ shown in FIG. 6, an experimental apparatus shown in FIG. 16 was used, for instance. This experimental apparatus includes: an opaque white panel 11 covering the whole visual field of a subject; a projector 12 presenting stimulus patterns shown in FIG. 17, and a calculator 13, and the experimental apparatus is installed in a dark room. The subjects are nine persons including men and women in their 20's with normal vision.

Experiments to find the relation between X and Z values and color sensation were conducted, where the stimulus patterns in FIG. 17 were presented by using the experimental apparatus in FIG. 16. As the stimulus patterns, color stimuli whose X and Z values were logarithmically changed in five stages were prepared, and they are combined so that contrast amounts Cx, Cz become 3, 2, 1, −1, 1, −2. The Y value was fixed (40 cd/m$^2$).

Each of the contrast amounts Cx, Cz is a logarithmic value corrected to an integer number, the logarithmic value being a value of a ratio between an X or Z value (Xt, Yt) of an object and an X or Z value (Xi, Zi) of the background, as shown by the following equations (10), (11).

$$Cx = 0.0569 \cdot \log(Xt/Xi) \quad (10)$$

$$Cz = 0.176 \cdot \log(Zt/Zi) \quad (11)$$

A visual angle was set to 7 levels, that is, 1 degree, 2 degrees, 5 degrees, 10 degrees, 20 degrees, 30 degrees, and 60 degrees, and 180 degrees (uniform over the whole visual field). Further, conditions in FIG. 18 were added.

Then, absolute evaluation of color sensation was made from data obtained by the experiments, by using an opponent-color color naming method (method based on an opponent color theory by Herring). In order to express the way colors are recognized by an RG value and a BY value, the evaluations obtained from the experiments are transformed to unique color components (the equation (12)). The unique colors mean red, green, blue, and yellow. Perceived saturation degree means chroma.

$$\text{unique color component} = \text{a ratio of unique color} \times \text{perceived saturation degree} \quad (12)$$

Then, since red and green, and blue and yellow are opponent perceptions, each pair is shown on one axis. Concretely, a value on an axis where a unique color component of red is positive and a unique color component of green is negative is an RG value. A value on an axis where a unique color component of yellow is positive and a unique color component of blue is negative is a BY value.

By using these measured values (RG value, BY value), multi regression analysis of the measured values is performed on assumption of a case where symlet 6 is used as the orthogonal wavelet and image resolution (visual angle per pixel) is about 1 degree, whereby values of the coefficients $C_1 \sim C_8$ shown in FIG. 6 can be decided. At the same time, the value of the constant term in the equation (1) (+6.290802) and the value of the constant term in the equation (5) (−3.27372) can also be decided.

(Accuracy Evaluation)

To evaluate accuracy of the transform by the image transform apparatus 10 of this embodiment, measured values by the experiments on the subjects conducted by using the experimental apparatus (FIG. 16), the stimulus patterns (FIG. 17), and so on which are the same as above are compared with pixel values (predicted values) of color sensation images (RG image, BY image) resulting from the transform of luminance/chromaticity images (X image, Y image, Z image).

Figure 19:
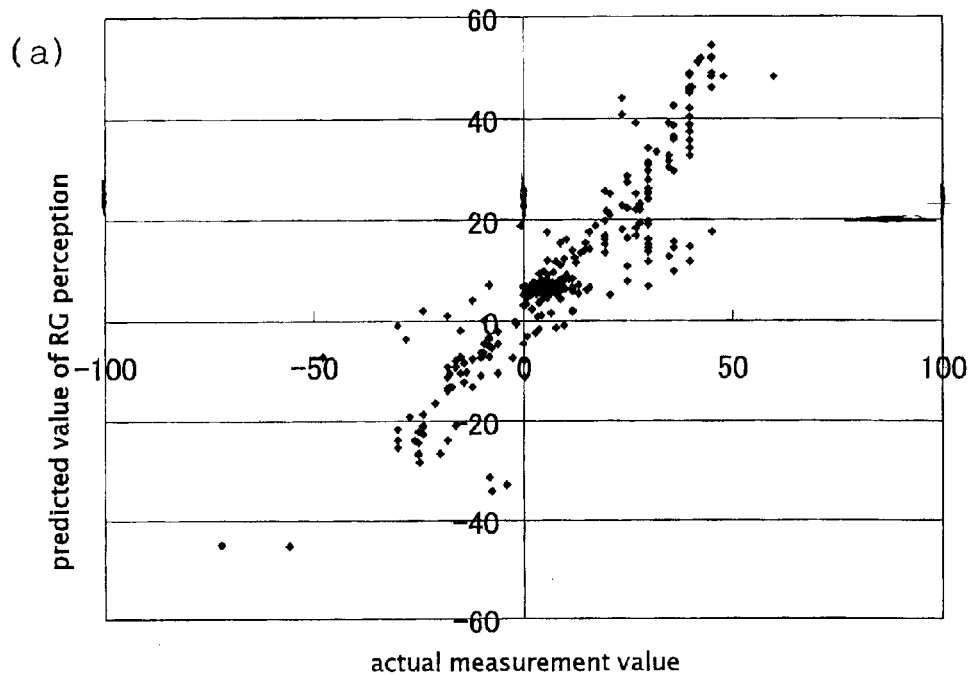
FIG. 19 are charts showing predicted accuracy of color sensation.
Figure 19:
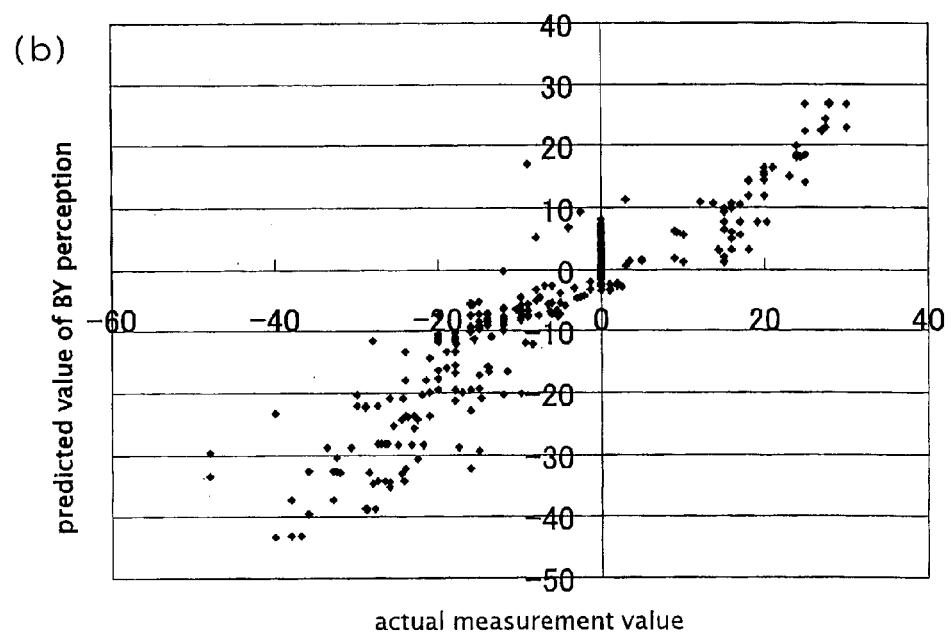

The comparisons between the predicted values and the measured values of RG perception and BY perception are shown in FIGS. 19 (a), (b). In FIG. 19, the horizontal axis represents the measured value and the vertical axis represents the predicted value. As is understood from FIG. 19, dots (♦) each representing the combination of each measured value and each predicted value are fully persuasive. In the case of RG perception, $R^2=0.867627$ and $R=0.931465$. In the case of BY perception, $R^2=0.854313$ and $R=0.924291$.

From the above results, it can be said that the arithmetic processing (FIG. 2) of the image transform in the image transform apparatus 10 of this embodiment is satisfactorily highly accurate. That is, according to the image transform apparatus 10 of this embodiment, even in a case where standard light cannot be set (in a case of color of an object under illumination in a real living environment, color of a light source such as a monitor, and the like), color sensation thereof can be quantitatively predicted with high accuracy.

(Modified Example)

The above embodiment has described, as an example, correlating of the XYZ color system and the L*a*b* color system with each other, but the present invention is not limited to this. There are various color systems of psycho-physical color (the RGB color system and the like) other than the XYZ color system, and there are various color systems of perceived color (the Lab color system, the L*u*v* color system, and the like) other than the L*a*b* color system, and in any combination thereof, it is possible to correlate a color system of psycho-physical color and a color system of perceived color with each other by applying the present invention.

Further, in the above-described embodiment, symlet 6 is used, for instance, as the orthogonal wavelet, but the present invention is not limited to this. Any other substantially symmetrical function (for example, symlet 4, 8, and the like) may be used for the same calculation. However, in a case where a function other than symlet 6 is used, values different from those in FIG. 6 and the equations (1), (5) need to be calculated as the coefficients representing the relation between psycho-physical color and perceived color. A calculation method thereof is the same as above.

Further, in the above-described embodiment, the same orthogonal wavelet is used for the transform from the luminance/chromaticity images to the color sensation images and for the inverse transform from the color sensation images to the luminance/chromaticity images, but different orthogonal wavelets may be used. In this case, since different appropriate coefficients (the relation between psycho-physical color and perceived color) exist for the respective orthogonal wavelets, it is necessary to find the appropriate coefficients by the above-described method to use them for the arithmetic processing of the image transform.

Further, in the above-described embodiment, the orthogonal wavelet is used, but the present invention is also applicable to a case where a nonorthogonal wavelet is used. In this case, approximation calculation is required at the time of the wavelet synthesis since the functions are not independent.

However, in a case where a completely restorable wavelet (for example, biorthogonal wavelet) is used by appropriately combining the wavelet used for the resolution and the wavelet used for the synthesis, the approximation calculation is not required even if the wavelets for the resolution/synthesis are non-orthogonal. Therefore, even in a case where the biorthogonal wavelet is used, it is possible to extremely reduce an error in the arithmetic processing of the image transform as in the case where the aforesaid orthogonal wavelet is used, which enables high-speed bi-directional transform to/from luminance/chromaticity images from/to color sensation images. Thus, the present invention is effective and provides the same effects not only in a case where each of the wavelets for the resolution/synthesis constitutes an orthogonal system, but also in a case where the combination of these wavelets constitutes an orthogonal system (bi-orthogonal), Further, in the above-described embodiment, the wavelet resolution is repeated up to −7 level, but the present invention is not limited to this. The lowest level may be set according to accuracy required for the image transform. Further, in a case where the size of an original image (for example, a luminance image) is small and the number of pixels of a sub band image becomes 1 before −7 level is reached, the wavelet resolution may be finished at this point in time.

The wavelet resolution may be continued even after the number of pixels of a sub band image becomes 1 and may be finished at a point in time when −7 level is reached.

Further, the values of the coefficients $C_1$~$C_8$ representing the relation between psycho-physical color and perceived color and the values of the constant terms in the equations (1) and (5) may be calculated for each kind of the orthogonal wavelets, and besides, in a case where resolution of an original image (for example, luminance/chromaticity images) is changed, these values are preferably calculated for each resolution.

Further, the above embodiment has described the example where the image transform apparatus 10 is a computer in which the image transform program is installed, but the present invention is not limited to this. The image transform apparatus 10 may be formed as a chip by using dedicated hardware (LSI). By forming the image transform apparatus 10 as a chip, real-time control of the illumination control and the like is enabled.

Further, in the above-described embodiment, the difference images (a image, b image) of the X image, the Y image, and the Z image are generated after a logarithm of each pixel value of the luminance/chromaticity images (X image, Y image, Z image) is calculated, but the present invention is not limited to this. The calculation of the logarithms is calculation in consideration of nonlinearity of a visual system, and the use of a Power Function such as, for example, ⅓th power instead of the logarithm can also provide the same effect, The Power Function may be set according to the expression of a uniform perception space.

Further, in the above-described embodiment, the result of the psychological evaluation experiment based on the absolute scale is used for color sensation, but a threshold value (a borderline value above or below which a difference is recognizable or not) or the like may be used for scaling.

Further, in the above-described embodiment, the resolution of an image is set to about 1 degree, but the present invention is not limited to this. Resolution may be set to any degree other than 1 degree (for example, higher resolution). However, in a case where the setting of the resolution is changed, a correspondence relation to the perception scale (coefficient) need to be calculated for each resolution.

Further, in the above-described embodiment, the number of times the wavelet resolution is performed is N times (N is a natural number), and (3N+1) sub band images are generated by executing the wavelet resolution N times, and thereafter, the coefficient processing is applied to all the sub band images, and all the (3N+1) sub band images having undergone the processing are subjected to the wavelet synthesis (N times), but the present invention is not limited to this. Among the sub band images having undergone the coefficient processing, sub band images in an arbitrary plural number smaller than (3N+1) may be subjected to the wavelet synthesis. However, using all the sub band images having undergone the coefficient processing for the wavelet synthesis enables more accurate transform, which enables bi-directional transform to/from luminance/chromaticity images from/to color sensation images.

Further, four sub band images are generated by one wavelet resolution, but the present invention is not limited to this. The present invention is applicable to any case where the number of sub band images generated by one wavelet resolution is two or more. Likewise, although sub band images at one level higher are generated from four sub band images by one wavelet synthesis, sub band images at one level higher may be generated from two sub band images or more.

Further, in the above-described embodiment, the number of times the wavelet resolution is performed at the time of the bi-directional transform to/from the luminance/chromaticity images from/to the color sensation images is set to the same number (for example, 7 times), but the present invention is not limited to this. The number of times the wavelet resolution is performed at the time of the transform from the luminance/chromaticity images to the color sensation images may be set different from the number of times the wavelet resolution is performed at the time of the inverse transform from the color sensation images to the luminance/chromaticity images.

Further, sub band images at seven resolution levels are handled at the time of the wavelet resolution and the wavelet synthesis, but the same effect can be obtained also in a case where sub band images at one resolution level or more are handled.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. An image transform apparatus comprising:
a resolution device performing wavelet resolution based on an image representing distribution of psycho-physical color to generate a sub band image at one resolution level or more;
a transform device transforming values of pixels of said sub band image from values of the psycho-physical color to values of perceived color based on a predetermined relation between the psycho-physical color and the perceived color; and
a synthesis device performing wavelet synthesis based on the sub band image at one resolution level or more resulting from the transform by said transform device, to generate an image representing distribution of the perceived color.

2. The image transform apparatus according to claim 1, wherein:
said image representing the distribution of the psycho-physical color is three images corresponding to tristimulus values of a color system of the psycho-physical color respectively; and
said image representing the distribution of the perceived color is two images corresponding to two kinds of perceived chromaticities of a color system of the perceived color respectively.

3. The image transform apparatus according to claim 2, wherein:
said resolution device generates a first one of said sub band image based on an X image and a Y image and generates a second one of said sub band image based on the Y image and a Z image, said X, Y, and Z images being corresponding to stimulus values of an XYZ color system respectively; and
after transforming values of pixels of said first sub band image to values of the perceived color and transforming values of pixels of said second sub band image to values of the perceived color respectively, said transform device adds results of the each respective transform at the same resolution level to generate the sub band image as objects of said wavelet synthesis.

4. The image transform apparatus according to claim 3, wherein:
said transform device generates a third sub band image as the objects of said wavelet synthesis based on said relation of RG perception in which hue and chroma of red-green are taken into consideration and generates a fourth sub band image as the objects of said wavelet synthesis based on said relation of BY perception in which hue and chroma of yellow-blue are taken into consideration; and
said synthesis device performs wavelet synthesis of said third sub band image to generate an image representing distribution of color components of the RG perception, and performs wavelet synthesis of said fourth sub band image to generate an image representing distribution of color components of the BY perception.

5. The image transform apparatus according to claim 1, wherein:
said resolution device uses an orthogonal wavelet to perform said wavelet resolution; and
said synthesis device uses said orthogonal wavelet to perform said wavelet synthesis.

6. The image transform apparatus according to claim 5, wherein
said orthogonal wavelet is a substantially symmetrical function.

7. The image transform apparatus according to claim 5, further comprising:
a second resolution device performing wavelet resolution based on said image representing the distribution of the perceived color, which is generated by said synthesis device, to generate a sub band image at one resolution level or more;
a second transform device transforming values of pixels of said sub band image generated by said second resolution device, from values of said perceived color to values of said psycho-physical color based on said relation; and
a second synthesis device performing wavelet synthesis based on the sub band image at one resolution level or more resulting from the transform by said second transform device, to generate an image representing distribution of the psycho-physical color.

8. The image transform apparatus according to claim 1, further comprising:
- an obtaining device obtaining information indicating an ambient environment of an output medium outputting said image representing the distribution of the psycho-physical color; and
- an inverse transform device inverse-transforming said image representing the distribution of the perceived color, which is generated by said synthesis device, to an image representing distribution of the psycho-physical color, based on the information indicating said ambient environment.

9. The image transform apparatus according to claim 8, further comprising
- a calculation device calculating an output value in said output medium, based on said image representing the distribution of the psycho-physical color, which is generated by said inverse-transform device.

10. A computer-readable medium comprising an image transform program causing a computer to execute:
- a resolution procedure for performing wavelet resolution based on an image representing distribution of psycho-physical color to generate a sub band image at one resolution level or more;
- a transform procedure for transforming values of pixels of said sub band image from values of the psycho-physical color to values of perceived color based on a predetermined relation between the psycho-physical color and the perceived color; and
- a synthesis procedure for performing wavelet synthesis based on the sub band image at one resolution level or more resulting from the transform by said transform device, to generate an image representing distribution of the perceived color.

11. The computer-readable medium according to claim 10, wherein the image transform program causes the computer to further execute:
- an obtaining procedure for obtaining information indicating an ambient environment of an output medium outputting said image representing the distribution of the psycho-physical color; and
- an inverse transform procedure for inverse-transforming said image representing the distribution of the perceived color, which is generated in said synthesis procedure, to an image representing distribution of the psycho-physical color, based on the information indicating said ambient environment.

12. The computer-readable medium according to claim 11, wherein the image transform program causes the computer to further execute
- a calculation procedure for calculating an output value in said output medium, based on said image representing the distribution of the psycho-physical color, which is generated in said inverse-transform procedure.

* * * * *